US011392256B2

(12) United States Patent
Nakayama et al.

(10) Patent No.: US 11,392,256 B2
(45) Date of Patent: Jul. 19, 2022

(54) CONDUCTIVE MEMBER AND TOUCH PANEL

(71) Applicant: FUJIFILM Corporation, Tokyo (JP)

(72) Inventors: Masaya Nakayama, Kanagawa (JP); Reona Ikeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/460,982

(22) Filed: Aug. 30, 2021

(65) Prior Publication Data

US 2021/0389844 A1 Dec. 16, 2021

Related U.S. Application Data

(63) Continuation of application No. 17/136,562, filed on Dec. 29, 2020, now Pat. No. 11,137,864, which is a (Continued)

(30) Foreign Application Priority Data

Mar. 6, 2017 (JP) .............................. JP2017-042090

(51) Int. Cl.
*G06F 3/044* (2006.01)

(52) U.S. Cl.
CPC .......... *G06F 3/0445* (2019.05); *G06F 3/0446* (2019.05); *G06F 3/0448* (2019.05); *G06F 2203/04112* (2013.01)

(58) Field of Classification Search
CPC ...... G06F 3/0446; G06F 3/0448; G06F 3/044; G06F 2203/04112; G02F 1/3338
See application file for complete search history.

(56) References Cited

U.S. PATENT DOCUMENTS

| 8,269,744 B2 | 9/2012 | Agari et al. |
| 8,953,131 B2 | 2/2015 | Park et al. |
| (Continued) | | |

FOREIGN PATENT DOCUMENTS

| JP | 2010-097536 A | 4/2010 |
| JP | 2014-029614 A | 2/2014 |
| (Continued) | | |

OTHER PUBLICATIONS

Office Action, issued by the Japanese Patent Office dated Dec. 7, 2021, in connection with Japanese Patent Application No. 2020-191621.

(Continued)

*Primary Examiner* — Sardis F Azongha
(74) *Attorney, Agent, or Firm* — Edwards Neils LLC; Jean C. Edwards, Esq.

(57) ABSTRACT

A conductive member includes: a transparent insulating member; and a plurality of first electrodes each of which extend in a first direction and which are arranged in juxtaposition in a second direction orthogonal to the first direction, wherein the first electrode has a first detection electrode portion having a first mesh pattern constituted by electrically connecting a plurality of first mesh cells formed of metal fine wires and a first dummy pattern portion in the first electrode which is formed of metal fine wires arranged inside the first mesh cell of the first mesh pattern so as to be insulated from the first detection electrode portion, and in at least one of the first mesh cells, a first projection portion projecting from one side of the first mesh cell is formed so as to abut an end portion of the metal fine wire that forms the first dummy pattern portion.

10 Claims, 12 Drawing Sheets

Related U.S. Application Data continuation of application No. 16/843,321, filed on Apr. 8, 2020, now Pat. No. 10,908,755, which is a continuation of application No. 16/551,081, filed on Aug. 26, 2019, now Pat. No. 10,649,606, which is a continuation of application No. PCT/JP2018/001097, filed on Jan. 17, 2018.

(56) References Cited

U.S. PATENT DOCUMENTS

| | | |
|---|---|---|
| 9,395,855 B2 | 7/2016 | Nakamura et al. |
| 10,331,237 B2 | 6/2019 | Nakamura |
| 10,359,890 B2 | 7/2019 | Nakamura et al. |
| 10,386,957 B2 | 8/2019 | Nakamura |
| 2011/0102370 A1 | 5/2011 | Kono et al. |
| 2011/0290631 A1 | 12/2011 | Kuriki |
| 2013/0161070 A1 | 6/2013 | Lee et al. |
| 2013/0169548 A1 | 7/2013 | Kim et al. |
| 2013/0327560 A1 | 12/2013 | Ichiki |
| 2013/0341070 A1 | 12/2013 | Kim et al. |
| 2014/0063374 A1 | 3/2014 | Kuriki |
| 2014/0152580 A1 | 6/2014 | Weaver et al. |
| 2014/0333555 A1 | 11/2014 | Oh et al. |
| 2015/0002464 A1 | 1/2015 | Nishioka et al. |
| 2015/0041301 A1 | 2/2015 | Lee et al. |
| 2015/0205422 A1 | 7/2015 | Choi et al. |
| 2015/0286323 A1 | 10/2015 | Iwami et al. |
| 2015/0346874 A1 | 12/2015 | Park et al. |
| 2016/0085339 A1 | 3/2016 | Yashiro et al. |
| 2016/0103526 A1 | 4/2016 | Sohn |
| 2016/0216806 A1 | 7/2016 | Nakamura |
| 2017/0228052 A1 | 8/2017 | Nakamura |
| 2017/0228090 A1 | 8/2017 | Nakamura |
| 2017/0363899 A1 | 12/2017 | Nakayama et al. |
| 2018/0373365 A1 | 12/2018 | Nakamura |

FOREIGN PATENT DOCUMENTS

| | | |
|---|---|---|
| JP | 2014-120038 A | 6/2014 |
| JP | 2014-219986 A | 11/2014 |
| JP | 2015-156232 A | 8/2015 |
| JP | 2016-503553 A | 2/2016 |
| JP | 2016-192188 A | 11/2016 |
| WO | 2015/060059 A1 | 4/2015 |
| WO | 2016/080046 A1 | 5/2016 |
| WO | 2016/084449 A1 | 6/2016 |
| WO | 2016/151909 A1 | 9/2016 |

OTHER PUBLICATIONS

International Search Report issued in PCT/JP2018/001097 dated Feb. 20, 2018.
Written Opinion issued in PCT/JP2018/001097 dated Feb. 20, 2018.
International Preliminary Report on Patentability Chapter II issued by WIPO dated May 29, 2019 in connection with International Patent Application No. PCT/JP2018/001097.
Office Action, issued by the State Intellectual Property Office of China dated Mar. 2, 2020, in connection with Chinese Patent Application No. 201880016110.3.
Office Action, issued by the State Intellectual Property Office of China dated Sep. 11, 2020, in connection with Chinese Patent Application No. 201880016110.3.

CONDUCTIVE MEMBER AND TOUCH PANEL

CROSS-REFERENCE TO RELATED APPLICATIONS

This application is a Continuation of US patent application Ser. No. 17/136,562, filed on Dec. 29, 2020, which is a Continuation of U.S. application Ser. No. 16/843,321, filed on Apr. 8, 2020, which issued as U.S. Pat. No. 10,908,755 on Feb. 2, 2021, which is a Continuation of U.S. application Ser. No. 16/551,081 filed on Aug. 26, 2019, which issued as U.S. Pat. No. 10,649,606 on May 12, 2020, which is a Continuation of PCT International Application No. PCT/JP2018/001097, filed on Jan. 17, 2018, which was published under PCT Article 21(2) in Japanese, and which claims priority under 35 U.S.C. § 119(a) to Japanese Patent Application No. 2017-042090, filed on Mar. 6, 2017. The above applications are hereby expressly incorporated by reference, in their entirety, into the present application.

BACKGROUND OF THE INVENTION

1. Field of the Invention

The present invention relates to a conductive member and particularly relates to a conductive member used as a touch panel.

The present invention also relates to a touch panel using a conductive member.

2. Description of the Related Art

In recent years, in various electronic devices including portable information devices such as tablet computers and smart phones, a touch panel which is used in combination with display devices such as liquid crystal display devices and which performs an input operation on an electronic device by causing members having tips thinner than those of fingers such as fingers and stylus pens to be in contact with or be close to a screen is in widespread.

In the touch panel, a conductive member in which a detection portion for detecting a touch operation by causing members having tips thinner than those of fingers such as fingers and stylus pens to be in contact with or be close to a transparent substrate is formed is used.

The detection portion is formed of a transparent conductive oxide such as Indium Tin Oxide (ITO), but is also formed of metal other than the transparent conductive oxide. Metal has advantages such as easy patterning, superior bending properties, and lower resistance compared to the above transparent conductive oxides, and thus metal such as copper or silver is used for conductive thin wires for the touch panels.

WO2015/060059A discloses a touch panel using metal fine wires. A touch panel of WO2015/060059A is an electrostatic capacitance sensor having a first conductive member formed of a plurality of first electrode patterns on a first substrate and a second conductive member formed of a plurality of second electrode patterns on a second substrate. The first electrode pattern and the second electrode pattern are respectively constituted by a plurality of cells having a substantially rhombic shape and are arranged along one direction on the first conductive member and the second conductive member. The first conductive member is layered on the second conductive member such that the plurality of first electrode patterns and the plurality of second electrode patterns are arranged along directions different from each other.

SUMMARY OF THE INVENTION

In a touch panel using a mesh pattern formed of such thin metal wires, in a case where a mesh pitch is set to a small value, parasitic capacitance of an electrode increases, and as a result, detection sensitivity of a touch position is lowered.

Meanwhile, in a case where the mesh pitch of the metal thin wires is increased in order to improve the detection sensitivity, a problem occurs in that a distance between the adjacent metal thin wires increases, the metal thin wires become more noticeable, and the visibility decreases. In a case where the mesh pitch of the thin metal wire is increased, a problem occurs in that moire caused by interference between a periodic thin pixel pattern of a display device used in combination with the touch panel and the thin metal wires becomes noticeable.

The present invention has been conceived in order to solve such problems in the related art, and has an object of providing a conductive member capable of improving the visibility and suppressing the generation of moire, even in a case where a detection electrode portion having a wide-pitch mesh pattern with a small parasitic capacitance and high detection sensitivity is used.

The present invention has another object of providing a touch panel comprising such a conductive member.

The conductive member according to the present invention is a conductive member having a transmissive region, comprising: a transparent insulating member; a plurality of first electrodes each of which extend in a first direction and which are arranged in juxtaposition in a second direction orthogonal to the first direction; and a plurality of second electrodes each of which extend in the second direction and which are arranged in juxtaposition in the first direction, in which the plurality of first electrodes and the plurality of second electrodes are opposed to each other with the transparent insulating member interposed therebetween, the first electrode has a first detection electrode portion having a first mesh pattern constituted by electrically connecting a plurality of first mesh cells formed of metal fine wires and a dummy pattern portion in the first electrode which is formed of metal fine wires arranged inside the first mesh cell of the first mesh pattern so as to be insulated from the first detection electrode portion, the second electrode has a second detection electrode portion having a second mesh pattern constituted by electrically connecting a plurality of second mesh cells formed of metal fine wires and a dummy pattern portion in the second electrode which is formed of metal fine wires arranged inside the second mesh cell of the second mesh pattern so as to be insulated from the second detection electrode portion, and in a region in which the first electrode and the second electrode are overlapped with each other, a third mesh pattern is constituted by a plurality of third mesh cells formed by combining the first detection electrode portion, the dummy pattern portion in the first electrode, the second detection electrode portion, and the dummy pattern portion in the second electrode.

It is preferable that the first mesh pattern has a first mesh pitch determined by an average value of distances in the first direction between centers of gravity of the first mesh cells adjacent to each other in the first direction, the second mesh pattern has a second mesh pitch determined by an average value of distances in the first direction between centers of gravity of the second mesh cells adjacent to each other in the first direction, the metal fine wires of the first mesh pattern and the metal fine wires of the second mesh pattern are arranged so as to be overlapped with each other in a point shape, the third mesh pattern has a third mesh pitch determined by an average value of distances in the first direction between centers of gravity of the third mesh cells adjacent to each other in the first direction, and the third mesh pitch is ¼ or less of the first mesh pitch and ¼ or less of the second mesh pitch.

It is preferable that each of the first mesh cell, the second mesh cell, and the third mesh cell each has a polygonal shape.

It is preferable that the first mesh pattern and the second mesh pattern are arranged such that centers of gravity of the first mesh cells and peaks of the second mesh cells are at positions different from each other.

It is preferable that the first mesh pattern and the second mesh pattern are arranged such that centers of gravity of the first mesh cells and centers of gravity of the second mesh cells are at positions different from each other.

It is preferable that the first mesh pattern and the second mesh pattern are arranged such that peaks of the first mesh cells and centers of gravity, of the second mesh cells are at positions different from each other.

It is preferable that the first mesh pitch and the second mesh pitch are 500 μm or more.

The first mesh pitch and the second mesh pitch may be identical to each other.

It is preferable that each of the first mesh cell, the second mesh cell, and the third mesh cell each has a quadrangular shape.

It is preferable that the first mesh pattern is constituted by the plurality of first mesh cells having the same shape, the second mesh pattern is constituted by the plurality of second mesh cells having the same shape, the third mesh pattern is constituted by the plurality of third mesh cells having the same shape, and the quadrangular shape is a rhombus.

It is preferable that the first mesh cell and the second mesh cell have the same shape.

A length of a side of the third mesh cell may have an irregular value of −10% to +10% with respect to an average value of lengths of sides of the plurality of third mesh cells constituting the third mesh pattern.

It is preferable that the first mesh pattern and the second mesh pattern has a gap of 150 μm or more between each end portion of the metal fine wire forming the dummy pattern portion in the electrode and each metal fine wire forming the mesh cell.

It is preferable that the first mesh pattern and the second mesh pattern has a gap of ¼ or more of a length of any one side of each mesh cell, between each end portion of the metal fine wire forming the dummy pattern portion in the electrode and each metal fine wire forming the mesh cell.

It is preferable that the dummy pattern portion in the first electrode and the dummy pattern portion in the second electrode do not include metal fine wire intersect to each other in a cross shape.

A touch panel according to the embodiment of the present invention is a touch panel using the conductive member.

According to the present invention, a first electrode arranged on a first surface of a transparent insulating substrate has a first detection electrode portion having a first mesh pattern and a dummy pattern portion in the first electrode that is insulated from the first detection electrode portion and arranged inside the first mesh cell of the first mesh pattern, a second electrode arranged on a second surface of a transparent insulating substrate has a second detection electrode portion having a second mesh pattern and a dummy pattern portion in the second electrode that is insulated from the second detection electrode portion and arranged inside the second mesh cell of the second mesh pattern, and a third mesh pattern is formed by combining the first detection electrode portion, the dummy pattern portion in the first electrode, the second detection electrode portion, and the dummy pattern portion in the second electrode. Therefore, even in a case where a detection electrode portion having a wide pitch mesh pattern with a small parasitic capacitance and high detection sensitivity is used, the visibility is improved, and also it is possible to suppress the generation of the moire in a case where a touch panel and a display device are combined with each other.

DESCRIPTION OF THE PREFERRED EMBODIMENTS

Hereinafter, a conductive member and a touch panel according to the embodiment of the present invention are specifically described based on preferred embodiments illustrated in the accompanying drawings.

Hereinafter, the expression "to" exhibiting a numerical value range includes numerical values indicated on both sides. For example, "s is a numerical value t1 to a numerical value t2" means that the range of s is a range including the numerical value t1 and the numerical value t2, and in a case of indicating by using mathematical symbols, $t1 \leq s \leq t2$.

Unless otherwise described, an angle including "orthogonal", "parallel", and the like includes generally accepted error ranges in the art.

"Transparent" means that the light transmittance is at least 40% or more, preferably 75% or more, more preferably 80% or more, and even more preferably 90% or more with respect to the visible light wavelength range of 400 to 800 nm. The light transmittance is measured by using "plastic—a method of obtaining total light transmittance and total light reflectance" regulated in JIS K 7375:2008.

Embodiment 1

Figure 1:
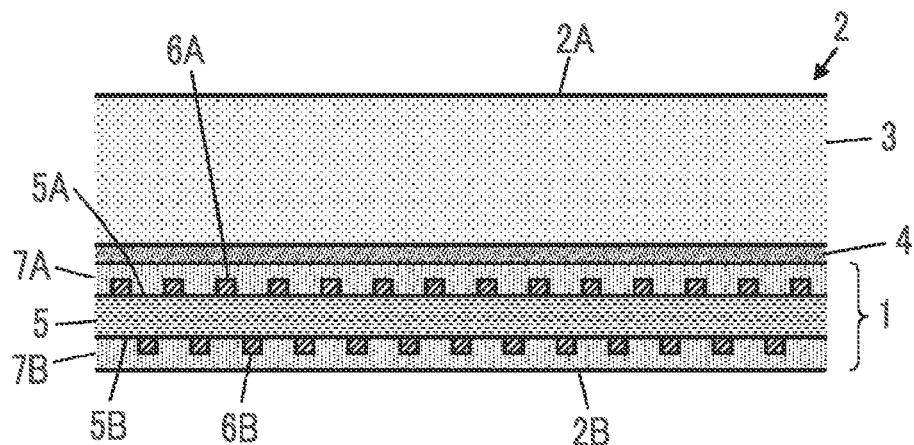
FIG. 1 is a partial cross sectional view illustrating a touch panel in which a conductive member according to Embodiment 1 of the present invention is used.

FIG. 1 illustrates a configuration of a touch panel 2 in which a conductive member 1 according to Embodiment 1 of the present invention is used.

The touch panel 2 has a front surface 2A and a back surface 2B, and is used in a state in which a display device (not illustrated) such as a liquid crystal display device is arranged on the back surface 2B side. The front surface 2A of the touch panel 2 is a touch detection surface, and becomes a viewing side on which an operator of the touch panel 2 observes an image of the display device through the touch panel 2.

The touch panel 2 has a transparent insulating cover panel 3 having a flat plate shape, which is arranged on the front surface 2A, and the conductive member 1 is bonded to a surface of the cover panel 3 opposite to the front surface 2A via a transparent adhesive 4.

In the conductive member 1, metal fine wires 6A and metal fine wires 6B are respectively formed on both surfaces of a transparent insulating substrate 5 which is a transparent insulating member. That is, in the conductive member 1, a plurality of first electrodes 11 formed of the metal fine wires 6A and a plurality of second electrodes 21 formed of the metal fine wires 6B are arranged to face with each other in an insulation state.

The transparent insulating substrate 5 has a first surface 5A that faces the front surface 2A side of the touch panel 2 and a second surface 5B that faces the back surface 2B side of the touch panel 2, and the metal fine wires 6A is formed on the first surface 5A, and the metal fine wires 6B are formed on the second surface 5B. As illustrated in FIG. 1, for the purpose of flattening or protecting the flattened metal fine wires 6A and the metal fine wires 6B, so as to cover the metal fine wires 6A and the metal fine wires 6B, transparent protective layers 7A and 7B are respectively arranged on the first surface 5A and the second surface 5B of the transparent insulating substrate 5.

Figure 2:
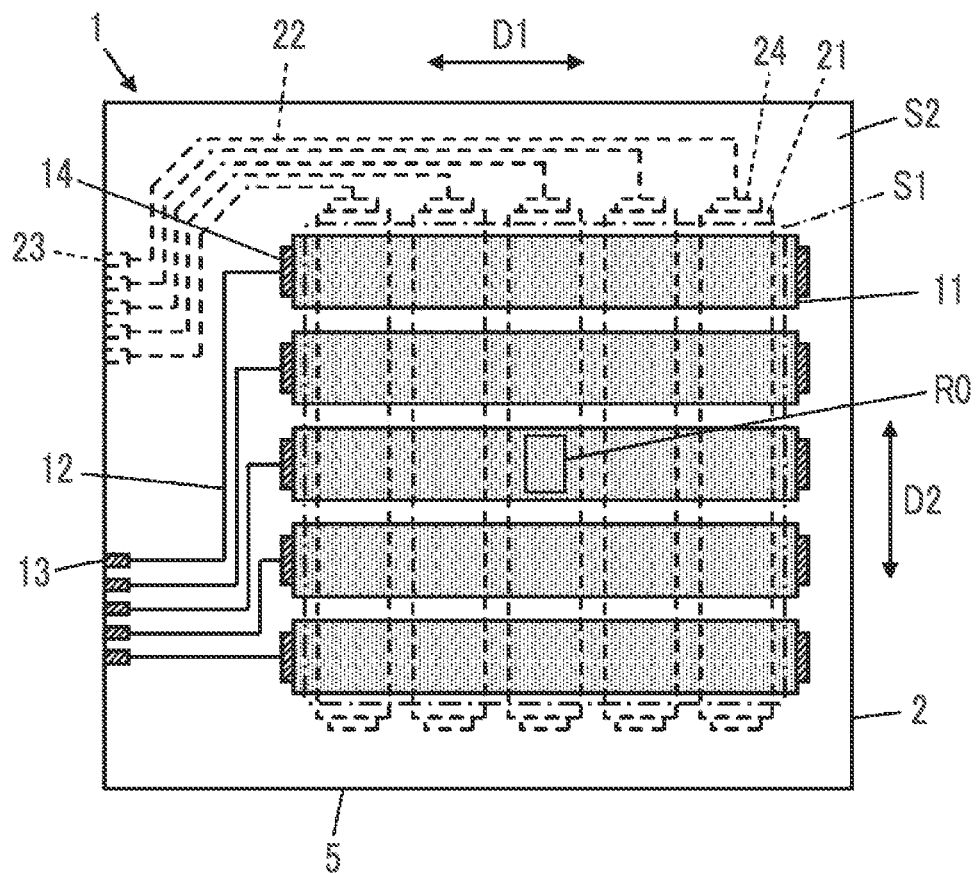
FIG. 2 is a plan view illustrating a conductive member according to Embodiment 1.

As illustrated in FIG. 2, in the conductive member 1, a transmissive region S1 is partitioned, and an edge part region S2 is partitioned on the outside of the transmissive region S1.

The plurality of first electrodes 11 which are constituted by the metal fine wires 6A, respectively extend along a first direction D1, and are arranged in juxtaposition with a second direction D2 orthogonal to the first direction D1 are formed on the first surface 5A of the transparent insulating substrate 5, and the plurality of second electrodes 21 which are constituted by the metal fine wires 6B, respectively extend along the second direction D2, and are arranged in juxtaposition with the first direction D1 are formed on the second surface 5B of the transparent insulating substrate 5. In this manner, the plurality of first electrodes 11 and the plurality of second electrodes 21 are arranged via the transparent insulating substrate 5.

The first electrodes 11 formed on the first surface 5A (viewing side) of the transparent insulating substrate 5 and the second electrodes 21 formed on the second surface 5B (display device side) of the transparent insulating substrate 5 are arranged on the transmissive region S1 so as to intersect with each other in plan view in an overlapping manner.

Meanwhile, a plurality of first edge part wires 12 connected to the plurality of first electrodes 11 are formed on the first surface 5A of the transparent insulating substrate 5 in the edge part region S2. A plurality of first external connection terminals 13 are formed in an array in an edge portion of the transparent insulating substrate 5, and the first connector portions 14 are formed on end portions of the first electrodes 11. One end portions of the corresponding first edge part wires 12 are connected to first connector portions 14, and the other end portions of the first edge part wires 12 are connected to the corresponding first external connection terminals 13. Here, in the first electrodes 11, a first connector portion may be formed also in the other end portion to which the first edge part wire 12 is not connected. The first connector portion formed in the other end portion of the first electrode 11 can be used as a terminal that connects the first edge part wires 12 and can be used as a terminal for a continuity test of the first electrode 11.

In the same manner, a plurality of second edge part wires 22 that are connected to the plurality of second electrodes 21 are formed on the second surface 5B of the transparent insulating substrate 5 in the edge part region S2. The plurality of second external connection terminals 23 are formed in an array in the edge portion of the transparent insulating substrate 5, and second connector portions 24 are respectively formed in the end portions of the second electrodes 21. One end portions of the corresponding second edge part wires 22 are connected to the second connector portions 24, and the other end portions of the second edge part wires 22 are connected to the corresponding second external connection terminals 23. Here, in the second electrode 21, a second connector portion may be also formed in the other end portion to which the second edge part wire 22 is not connected. The second connector portion formed in the other end portion of the second electrode 21 can be used as a terminal for connecting the second edge part wire 22 or can be used as a terminal for a continuity test of the second electrodes 21.

Figure 3:
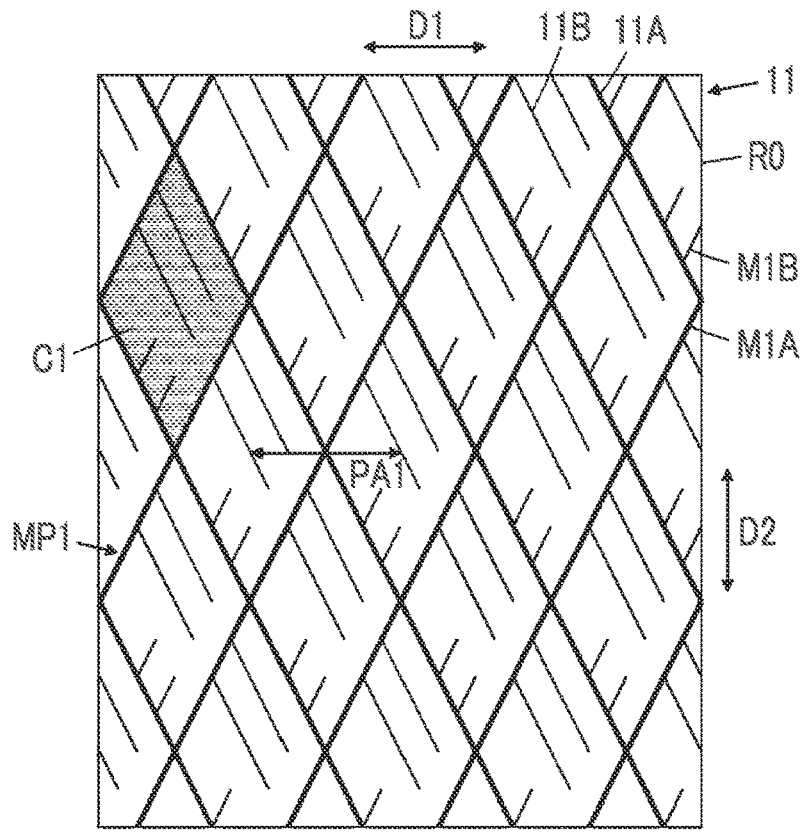
FIG. 3 is a partial plan view illustrating only a first electrode in an electrode intersection portion of the conductive member according to Embodiment 1 seen from viewing side.

FIG. 3 illustrates a partial plan view of only the first electrode 11 in a region R0 in an electrode intersection portion, in which the first electrodes 11 and the second electrodes 21 are overlapped with each other, seen from viewing side. The region R0 in the electrode intersection portion is a region in which, in a case where the conductive member 1 is seen in a direction orthogonal to the first direction D1 and the second direction D2, the first electrodes 11 and the second electrodes 21 are overlapped with each other.

The first electrode 11 has first detection electrode portions 11A which are drawn by relatively thick lines in FIG. 3 and dummy pattern portions 11B in the first electrode which are drawn by relatively thin lines in FIG. 3. The first detection electrode portions 11A and the dummy pattern portions 11B in the first electrode are respectively formed of metal fine wires M1A and metal fine wires M1B, and the dummy pattern portions 11B in the first electrode are arranged so as to be not electrically connected to the first detection electrode portions 11A and be insulated from the first detection electrode portions 11A.

The first detection electrode portion 11A forms a first mesh pattern MP1. The first mesh pattern MP1 is a mesh pattern having a first mesh pitch PA1 which is formed by using rhombic first mesh cells C1 as constitutional units and electrically connecting the plurality of first mesh cells C1. Here, the first mesh pitch PA1 is defined as an average value of a distance P1 in the first direction D1 between centers of gravity of the first mesh cells C1 adjacent to each other in the first direction D1. As illustrated in FIG. 3, in a case where the first mesh pattern MP1 is a pattern constituted by the first mesh cells C1 having the same shape, PA1=P1. In view of decreasing a parasitic capacitance of the first detection electrode portion 11A and improving the sensitivity of a touch panel, the first mesh pitch PA1 is preferably 500 μm or more.

Figure 4:
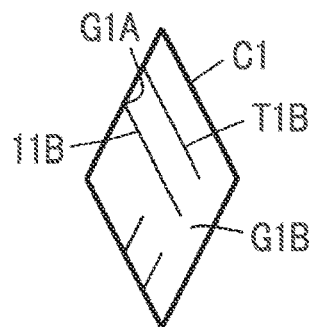
FIG. 4 is a plan view illustrating only a dummy pattern portion in the first electrode arranged inside each mesh cell of a first mesh pattern of the first electrode according to Embodiment 1 seen from viewing side.

As illustrated in FIG. 4, the dummy pattern portions 11B in the first electrode having at least one first dummy unit pattern T1B are arranged inside of the first mesh cells C1 of the first mesh pattern MP1. The first dummy unit pattern T1B is a pattern which forms the dummy pattern portions 11B in the first electrode and in which the plurality of metal fine wires M1B not having intersection are arranged so as to be spaced from each other, that is, a pattern that does not include the metal fine wires M1B that intersect with each other in a cross shape. As illustrated in FIG. 3, the dummy pattern portions 11B in the first electrode are preferably arranged inside all of the first mesh cells C1.

Figure 5:
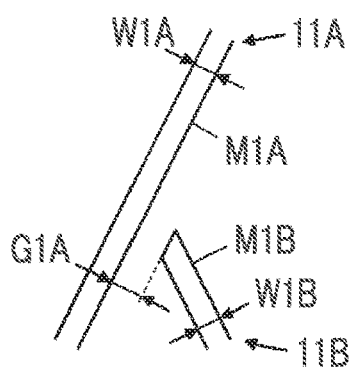
FIG. 5 is a partial enlarged plan view illustrating metal fine wires forming the first detection electrode portion of the first electrode and metal fine wires forming the dummy pattern portion in the first electrode.

As illustrated in FIG. 5, in order to secure visibility, it is desirable that a line width W1A of the metal fine wires M1A that form the first detection electrode portions 11A and a line width W1B of the metal fine wires M1B that form the dummy pattern portions 11B in the first electrode is set, for example, in the range of 0.5 μm to 5 μm. In the present specification, the expression "to secure visibility" means that, in a case where the conductive member 1 is used in the touch panel 2 illustrated in FIG. 1, the presence of the metal fine wires M1A and M1B is not observed with bare eyes, and an image of a display device (not illustrated) is clearly checked through the conductive member 1.

The line width W1A of the metal fine wires M1A that form the first detection electrode portions 11A and the line width W1B of the metal fine wires M1B that form the dummy pattern portions 11B in the first electrode are preferably the same value with each other, but may be different from each other.

In FIG. 3, there are a plurality of false intersection points that are seen as the metal fine wires M1A that form the first detection electrode portions 11A and the metal fine wires M1B that form the dummy pattern portions 11B in the first electrode intersect with each other, but, as illustrated in FIGS. 4 and 5, even in the false intersection points, in order to secure insulating properties, the metal fine wires M1A and the metal fine wires M1B are spaced from each other to have first gaps G1A and are not in contact with each other. Therefore, the metal fine wires M1A that form the first detection electrode portions 11A and the metal fine wires M1B that form the dummy pattern portions 11B in the first electrode are formed on the same surface (the first surface 5A) of the transparent insulating substrate 5 but are in a state of being electrically insulated from each other. As illustrated in FIG. 4, the first electrode 11 has a portion in which the metal fine wire M1A and the metal fine wire M1B are spaced from each other by a second gap G1B that is longer than the first gap G1A. The first gap G1A between the metal fine wire M1A and the metal fine wire M1B preferably has a length of 0.5 μm or more and more preferably has a length of 5 μm to 25 μm. Otherwise, the first gap G1A preferably has a length of 1/2,000 or more of a length of one side of the first mesh cell C1 and more preferably has a length of 1/200 to 1/40. Here, the length of the first gap G1A is defined by a distance of a line extending the metal fine wire M1B that form the dummy pattern portion 11B in the first electrode in a straight line shape from an end portion of the metal fine wire M1B to an intersection with the metal fine wire M1A that forms the first detection electrode portions 11A. The second gap G1B preferably has a length of 100 μm or more and more preferably has a length of 150 μm or more. Otherwise, the second gap G1B preferably has a length of 1/10 or more of a length of one side of the first mesh cell C1, more preferably has a length of 1/5 or more, and even more preferably has a length of 1/4 or more. In this manner, in a case where the second gap G1B has a length of 150 μm or more, it is possible to secure further insulating properties between the first detection electrode portion 11A and the dummy pattern portion 11B in the first electrode and improve detection sensitivity in a case where the conductive member 1 is used in the touch panel 2. The length of the second gap G1B is defined by the same length as the first gap G1A.

Figure 6:
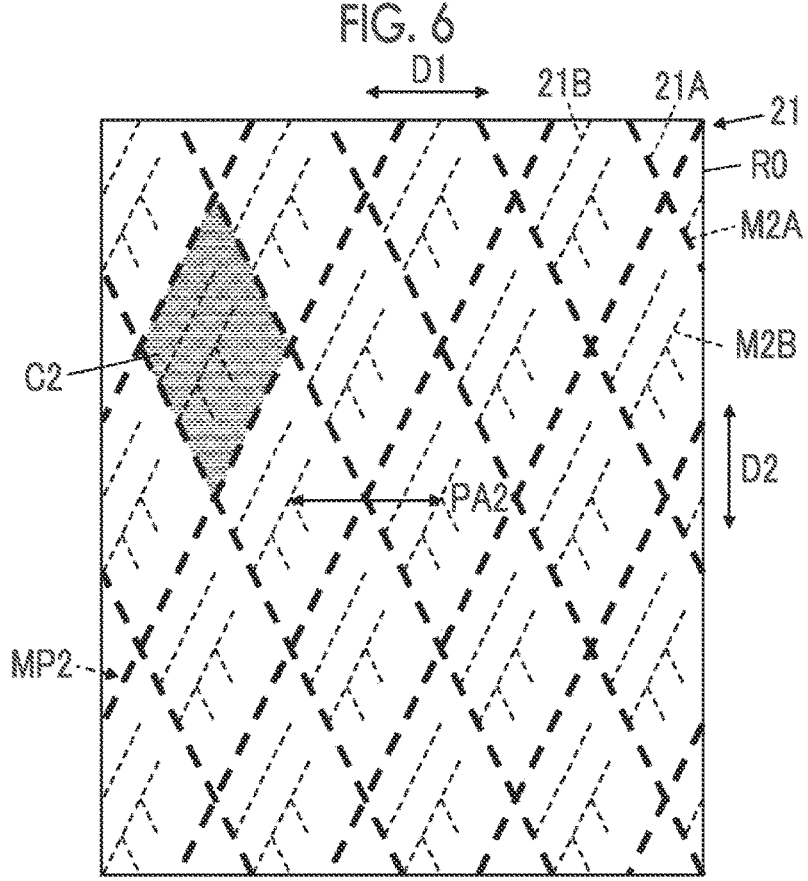
FIG. 6 is a partial plan view of only a second electrode in the electrode intersection portion of the conductive member according to Embodiment 1 seen from viewing side.

FIG. 6 illustrates a partial plan view in which only the second electrode 21 in the region R0 in the electrode intersection portion in which the first electrode 11 and the second electrode 21 are overlapped with each other is seen from a viewing side.

The second electrode 21 has second detection electrode portions 21A drawn by relatively thick broken lines in FIG. 6 and dummy pattern portions 21B in the second electrode drawn by relatively thin broken lines in FIG. 6. The second detection electrode portions 21A and the dummy pattern portions 21B in the second electrode are respectively formed of metal fine wires M2A and metal fine wires M2B, and the dummy pattern portions 21B in the second electrode are arranged so as be not electrically connected to the second detection electrode portions 21A and be insulated from the second detection electrode portions 21A.

The second detection electrode portions 21A form a second mesh pattern MP2. In the same manner as the first mesh pattern MP1, the second mesh pattern MP2 is a mesh pattern having a second mesh pitch PA2 which is formed by using rhombic second mesh cells C2 as constitutional units and electrically connecting the plurality of rhombic second mesh cells C2 Here, the second mesh pitch PA2 is defined by an average value of a distance P2 between in the first direction D1 centers of gravity of the second mesh cells C2 that are adjacent to each other in the first direction D1. As illustrated in FIG. 6, in a case where the second mesh pattern MP2 is a pattern constituted by the second mesh cells C2 having the same shape. PA2=P2 is satisfied. In view of decreasing a parasitic capacitance of the second detection electrode portion 21A and improving the sensitivity of the touch panel, the second mesh pitch PA2 is preferably 500 μm or more.

The second mesh pitch PA2 can be determined by a value different from the first mesh pitch PA1, but it is preferable that the second mesh pitch PA2 is the same as the first mesh pitch PA1, since the detection sensitivity of the first electrodes 11 and second electrodes 12 can be caused to be in the same level, and the detection sensitivity of the touch panel can be homogenized, and according to the aspect, the following description is made.

Figure 7:
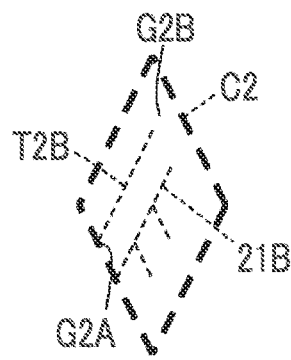
FIG. 7 is a plan view of a dummy pattern portion in the second electrode arranged inside each mesh cell of a second mesh pattern of the second electrode in Embodiment 1 seen from viewing side.

As illustrated in FIG. 7, the dummy pattern portions 21B in the second electrode having second dummy unit patterns T2B are arranged in the second mesh cell C2 of the second mesh pattern MP2. The second dummy unit pattern T2B is a pattern not including the metal fine wires M2B that intersect with each other in a cross shape. As in FIG. 6, the dummy pattern portions 21B in the second electrode are preferably arranged inside all the second mesh cell C2.

Figure 8:
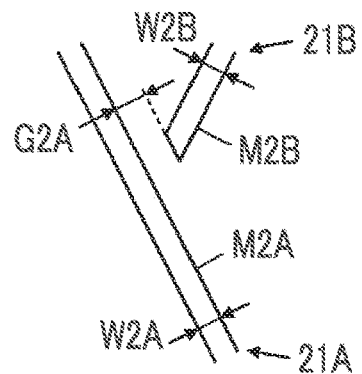
FIG. 8 is a partial enlarged plan view illustrating metal fine wires forming a second detection electrode portion of the second electrode and metal fine wires forming a dummy pattern portion in the second electrode.

As illustrated in FIG. 8, in order to secure the visibility, it is desirable that a line width W2A of the metal fine wire M2A that forms the second detection electrode portion 21A and a line width W2B of the metal fine wire M2B that forms the dummy pattern portions 21B in the second electrode are set in the range of 0.5 μm to 5 μm.

The line width W2A of the metal fine wire M2A that forms the second detection electrode portion 21A and the line width W2B of the metal fine wire M2B that forms the dummy pattern portions 21B in the second electrode are preferably the same with each other but may be different from each other.

In FIG. 6, there are a plurality of false intersection points in which the metal fine wires M2A that form the second detection electrode portions 21A and the metal fine wires M2B that form the dummy pattern portions 21B in the second electrode are observed to intersect with each other, but as illustrated in FIGS. 7 and 8, even in the false intersection points, in order to secure insulating properties from each other, the metal fine wires M2A and the metal fine wires M2B are spaced from each other via a first gap G2A and are not in contact with each other. Therefore, though the metal fine wires M2A that form the second detection electrode portions 21A and the metal fine wires M2B that form the dummy pattern portions 21B in the second electrode are formed on the same surface (the second surface 5B) of the transparent insulating substrate 5, but are electrically insulated from each other. As illustrated in FIG. 7, the metal fine wires M2A and the metal fine wires M2B have portions spaced by a second gap G2B which is longer than the first gap G2A. For example, the first gap G2A between the metal fine wire M2A and the metal fine wire M2B preferably has a length of 15 μm or more and more preferably has a length of 5 μm to 25 μm. Otherwise, the first gap G2A preferably has a length of 1/2,000 or more of a length of one side of the second mesh cell C2 and more preferably a length of 1/200 to 1/40. Here, the length of the first gap G2A is defined by a distance of a line extending the metal fine wires M2B that form the dummy pattern portions 21B in the second electrode in a straight line shape from an end portion of the metal fine wires M2B to an intersection with the metal fine wires M2A that forms the second detection electrode portions 21A. The second gap G2B preferably has a length of 100 μm or more and more preferably has a length of 150 μm or more. Otherwise, the second gap G2B preferably has a length of 1/10 or more of a length of one side of the second mesh cell C2, more preferably a length of 1/5 or more, and even more preferably a length of 1/4 or more. In this manner, by causing the second gap G2B to have a length of 150 μm or more, it is possible to secure further insulating properties between the second detection electrode portions 21A and the dummy pattern portions 21B in the second electrode, and it is possible to improve the detection sensitivity in a case of using the conductive member 1 in the touch panel 2. The length of the second gap G2B can be defined by the same length of the first gap G2A.

Figure 9:
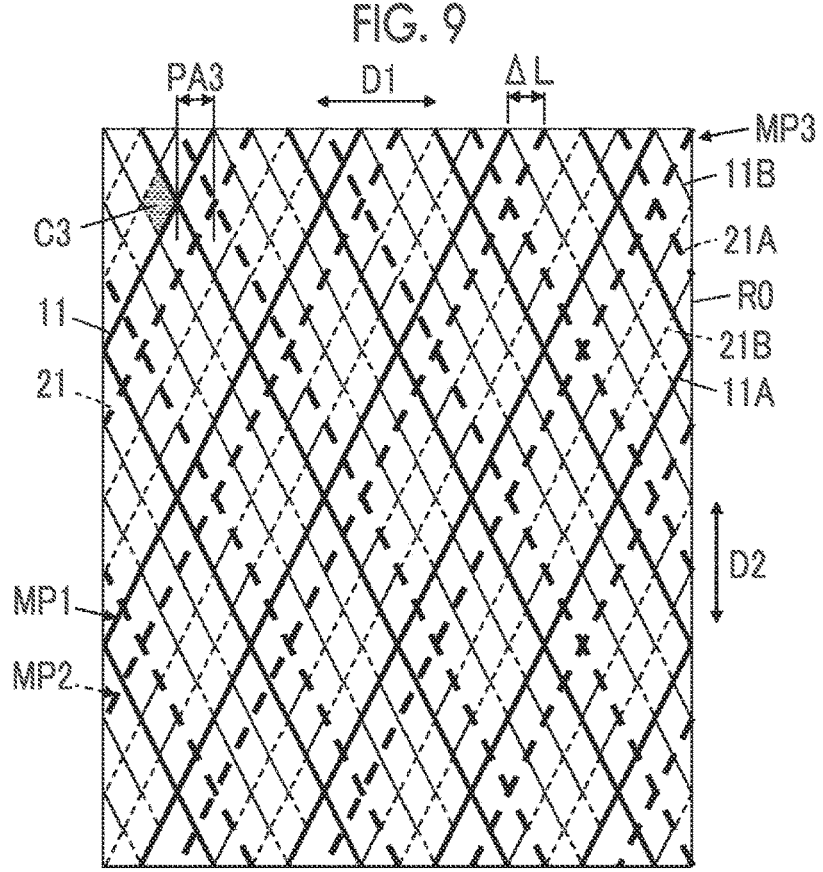
FIG. 9 is a partial plan view illustrating a third mesh pattern formed of the first electrode and the second electrode in the electrode intersection portion of the conductive member according to Embodiment 1 seen from viewing side.

Here, the second mesh pattern MP2 is arranged in a position in which a peak of the first mesh cell C1 and a peak of the second mesh cell C2 are deviated by ¼ of the first mesh pitch PA1 in the first direction D1 such that a center of gravity of the first mesh cell C1 and a peak of the second mesh cell C2 are overlapped with each other, with respect to the first mesh pattern MP1 Accordingly, in the region R0 in the electrode intersection portion, in a case where the first electrodes 11 that are formed on the first surface 5A of the transparent insulating substrate 5 and the second electrodes 21 that are formed on the second surface 5B of the transparent insulating substrate 5 are observed on the viewing side, as illustrated in FIG. 9, the first detection electrode portions 11A of the first electrodes 11 and the dummy pattern portions 11B in the first electrode, and the second detection electrode portions 21A of the second electrodes 21 and the dummy pattern portions 21B in the second electrode are combined with each other, so as to form the third mesh pattern MP3 constituted by rhombic third mesh cells C3. Specifically, a metal fine wire that forms the first mesh pattern MP1 and a metal fine wire that forms the second mesh pattern MP2 are arranged so as to be overlapped with each other in a dot shape. That is, the first mesh pattern MP1 and the second mesh pattern MP2 are not overlapped with each other in a line shape. By causing the patterns to be arranged so as to be overlapped with each other in a dot shape, it is possible to decrease the parasitic capacitance in the electrode intersection portion, it is possible to improve the detection sensitivity of the touch panel 2. That is, the second mesh pattern MP2 can be arranged at a position of being deviated by a distance ΔL in the first direction D1 with respect to the first mesh pattern MP1. Particularly, it is preferable that the patterns are arranged such that the center of gravity of the first mesh cell C1 and the peak of the second mesh cell C2 are in different positions. According to this arrangement, the parasitic capacitance in the electrode intersection portion can be decreased, and the detection sensitivity of the touch panel can be improved. As illustrated in FIG. 9, it is preferable that relative positions of the first mesh pattern MP1 and the second mesh pattern MP2 are set such that an interval between the metal fine wire that forms the second mesh pattern MP2 and the metal fine wire that is adjacent to this metal fine wire and forms the first mesh pattern MP1 becomes ¼ of the first mesh pitch PA1. Accordingly, since the parasitic capacitance in the electrode intersection portion can be effectively decreased, and also the visibility can be improved, the detection sensitivity of the touch panel 2 in a case of using the conductive member 1 can be improved and the visibility can be improved.

A third mesh pattern MP3 is a mesh pattern having a third mesh pitch PA3 which is formed by using the rhombic third mesh cells C3 as constitutional units. The third mesh cell C3 may not be a cell shape that is completely closed and may have a structure having a gap (internal) in a portion of the cells. The length of the gap is 0.5 to 30 μm.

Here, the third mesh pitch PA3 is defined by an average value of a distance P3 in the first direction D1 between centers of gravity of the third mesh cells C3 that are adjacent to each other in the first direction D1. The third mesh pitch PA3 has a value of ¼ of the first mesh pitch PA1 and the second mesh pitch PA2 of the first mesh pattern MP1 and the second mesh pattern MP2. The third mesh pitch PA3 can be ¼ or less of the first mesh pitch PA1 and the second mesh pitch PA2. In this case, the third mesh pitch PA3 is preferably ¼, ⅙, or ⅛ of the first mesh pitch PA1 and the second mesh pitch PA2 Particularly, in view of visibility of the metal fine wire and detection sensitivity of the touch panel, the third mesh pitch PA3 is preferably ¼ of the first mesh pitch PA1 and the second mesh pitch PA2.

In this manner, the first detection electrode portions 11A of the first electrodes 11 formed on the first surface 5A of the transparent insulating substrate 5 form the first mesh pattern MP1, the dummy pattern portions 11B in the first electrode that are insulated from the first detection electrodes 11A in the first mesh cells C1 constituting the first mesh pattern MP1 are arranged, the second detection electrode portions 21A of the second electrodes 21 formed in the second surface 5B of the transparent insulating substrate 5 form the second mesh pattern MP2, the dummy pattern portions 21B in the second electrode that are insulated from the second detection electrode portion 21A in the second mesh cell C2 constituting the second mesh pattern MP2 are arranged, and the first detection electrode portions 11A of the first electrodes 11 and the dummy pattern portions 11B in the first electrode are combined with the second detection electrode portions 21A of the second electrodes 21 and the dummy pattern portions 21B in the second electrode to form the third mesh pattern MP3 constituting the third mesh cell C3.

Therefore, the first mesh pitch PA1 of the first mesh pattern MP1 that is formed by the first detection electrode portions 11A of the first electrodes 11 that is used for the detection of a touch operation and the second mesh pitch PA2 of the second mesh pattern MP2 that is formed by the second detection electrode portions 21A of the second electrodes 21 can be set to be longer than the third mesh pitch PA3 of the third mesh pattern MP3. In Embodiment 1, the first mesh pitch PA1 and the second mesh pitch PA2 are as large as four times the third mesh pitch PA3.

Accordingly, in a case of being seen from the viewing side, the interval of the adjacent metal fine wires M1A, M1B, M2A, and M2B can be narrowed down such that the presence of the metal fine wires M1A, M1B, M2A, and M2B become invisible, and the size and the angle of the third mesh cell C3 are selected to design the third mesh pattern MP3 such that the generation of the moire in a case of using a display device (not illustrated) in combination with the touch panel 2 is decreased. Therefore, the parasitic capacitances of the first detection electrode portions 11A and the second detection electrode portions 21A can be reduced. In this manner, even in a case of using a detection electrode portion having less parasitic capacitance, high detection sensitivity, and a mesh pattern with a wide pitch, for example, a wide pitch of 500 μm or more, together with improving the visibility, the generation of the moire in a case of combining the touch panel 2 and a display device can be suppressed.

Though not illustrated, a configuration of having a dummy electrode electrically insulated from the first detection electrode portions 11A of these first electrodes 11 in a region between the first electrodes 11 adjacent to each other which are arranged in juxtaposition on the first surface 5A of the transparent insulating substrate 5 and having a dummy electrode electrically insulated from the second detection electrode portions 21A of these second electrodes 21 in the region between the second electrodes 21 adjacent to each other which are arranged in juxtaposition on the second surface 5B of the transparent insulating substrate 5. At this point, the first electrode 11 can have a disconnected portion for insulating the first detection electrode portion 11A and the dummy electrode, and the second electrode 21 can have a disconnected portion for insulating the second detection electrode portion 21A and the dummy electrode.

The dummy electrode that is positioned between the first electrodes 11 adjacent to each other is formed of a metal fine wire to have a pattern by the first detection electrode portions 11A of the first electrodes 11 and the dummy pattern portions 11B in the first electrode as illustrated in FIG. 3. The dummy electrode that is positioned between the plurality of second electrodes 21 is formed of a metal fine wire having a pattern by the second detection electrode portions 21A of the second electrodes 21 and the dummy pattern portions 21B in the second electrode as illustrated in FIG. 6.

Each of the disconnection widths of the disconnected portion for insulating the first detection electrodes 11A and the dummy electrode and the disconnected portion for insulating the second detection electrode portion 21A and the dummy electrode is preferably 0.5 to 30 µm. A disconnected portion may be further provided in the metal fine wire inside the dummy electrode. For example, one or more disconnected portions may be provided to each side of the mesh cell constituting the dummy electrode.

In a case where such a dummy electrode is formed on each of the first surface 5A and the second surface 5B of the transparent insulating substrate 5, in a case of being seen from the viewing side, not only on the electrode intersection portion in which the first electrodes 11 and the second electrodes 21 are overlapped with each other, but also on the entire surface of the transmissive region S1, the third mesh pattern MP3 illustrated in FIG. 9 is formed, such that the pattern appearance of the first electrodes 11 and the second electrodes 21 can be prevented, and also the improvement of the visibility and the decrease of the moire generation can be realized.

In the above, a configuration in which the first electrodes 11 and the second electrodes 21 formed of metal fine wires are arranged on both surfaces of the transparent insulating substrate 5 illustrated in FIG. 1 is described, but the present invention is not limited to the configuration. The present invention may have a configuration in which the first electrodes 11 and the second electrodes 21 are insulated from the transparent insulating member, may be a configuration in which two sheets of electrode substrates illustrated in FIG. 11 of JP2016-126731A are bonded via a transparent pressures sensitive adhesive layer, or may be a configuration in which column wires and row wires are provided on a transparent substrate via an interlayer insulation film as illustrated in FIG. 4 of JP2010-097536A. In the former case, the electrode substrate and the transparent pressure sensitive adhesive layer constitute the transparent insulating member, and in the latter case, the interlayer insulation film corresponds to the transparent insulating member.

Hereinafter, each member constituting the conductive member 1 is described.

<Transparent Insulating Substrate>

The transparent insulating substrate 5 is not particularly limited, as long as the transparent insulating substrate is transparent, has electric insulation properties, and supports the first electrodes 11 and the second electrodes 21, but as the material constituting the transparent insulating substrate 5, for example, tempered glass, alkali free glass, polyethylene terephthalate (PET), polyethylene naphthalate (PEN), a cyclo-olefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), and triacetate cellulose (TAC) can be used. The thickness of the transparent insulating substrate 5 is, for example, 20 to 1,000 µm, and particularly preferably 30 to 100 µm.

The total light transmittance of the transparent insulating substrate 5 is preferably 40% to 100%. The total light transmittance is measured by using "plastic—a method of obtaining total light transmittance and total light reflectance" regulated in JIS K 7375:2008.

One of the preferred embodiments of the transparent insulating substrate 5 is a treated substrate that has been subjected to at least one treatment selected from the group consisting of an atmospheric pressure plasma treatment, a corona discharge treatment, and an ultra violet irradiation treatment. By performing the above treatment, a hydrophilic group such as an OH group is introduced to the front surface of the treated transparent insulating substrate 5, and adhesiveness between the first electrodes 11 and the second electrodes 21 is improved. Among the above treatments, in view of improving the adhesiveness between the first electrodes 11 and the second electrodes 21, an atmospheric pressure plasma treatment is preferable.

Another preferred aspect of the transparent insulating substrate 5 preferably has undercoat layers including polymers on the first surface 5A on which the first electrodes 11 are formed and the second surface 5B on which the second electrodes 21 are formed. In a case where photosensitive layers for forming the first electrode 11 and the second electrode 21 are formed on this undercoat layer, adhesiveness between the first electrode 11 and the first surface 5A and between the second electrode 21 and the second surface 5B are further improved.

The method of forming the undercoat layer is not particularly limited, but examples thereof include a method of coating a substrate with a composition for forming an undercoat layer including a polymer, and performing a heat treatment, if necessary. The composition for forming an undercoat layer may include a solvent, if necessary. The types of the solvent are not particularly limited, but examples thereof include a solvent used in the composition for forming a photosensitive layer described below. A latex including polymer fine particles as the composition for forming an undercoat layer including a polymer may be used. The refractive index of the undercoat layer may be adjusted so as to use the undercoat layer as a refractive index adjusting layer for decreasing the reflection of the transparent insulating substrate 5.

The thickness of the undercoat layer is not particularly limited, but in view of causing the adhesiveness of the first electrode 11 and the second electrode 21 with the transparent insulating substrate 5 to be excellent, the thickness is preferably 0.02 to 0.3 µm and more preferably 0.03 to 0.2 µm.

If necessary, the conductive member 1 may include an antihalation layer in addition to the above undercoat layer, as another layer between the transparent insulating substrate 5 and the first electrode 11 and the second electrode 21.

<Metal Fine Wire>

With reference to FIGS. 5 and 8, as described above, in order to secure visibility, it is desirable that the metal fine wire M1A that forms the first detection electrode portion 11A of the first electrode 11, the metal fine wire M1B that forms the dummy pattern portions 11B in the first electrode, the metal fine wire M2A that forms the second detection electrode portion 21A of the second electrode 21, and the metal fine wire M2B that forms the dummy pattern portions 21B in the second electrode, for example, have a line width set in the range of 0.5 to 5 µm. In a case where the metal fine wires M1A, M1B, M2A, and M2B have such a line width, the first detection electrode portions 11A and the second detection electrode portions 21A which have low resistances can be comparatively easily formed.

The thicknesses of the metal fine wires M1A, M1B, M2A, and M2B are not particularly limited, but the thickness is preferably 0.01 to 200 µm, more preferably 30 µm or less, even more preferably 20 μm or less, particularly preferably 0.01 to 9 μm, and most preferably 0.05 to 5 μm. Accordingly, the resistance reduction of the first detection electrode portion 11A and the second detection electrode portion 21A and improvement of the durability of the first detection electrode portions 11A, the dummy pattern portions 11B in the first electrode, the second detection electrode portions 21A, and the dummy pattern portions 21B in the second electrode can be comparatively easily realized.

The metal fine wires M1A, M1B, M2A, and M2B use metal or alloy as a forming material and can be formed of, for example, copper, aluminum, or silver. It is preferable that the metal fine wires M1A, M1B, M2A, and M2B include metallic silver, but may include metals other than metallic silver such as gold and copper. It is preferable that the metal fine wires M1A, M1B, M2A, and M2B include metallic silver, gelatin, and a polymer binder such as an acry•styrene-based latex, which are suitable for forming a mesh pattern. As the materials of the metal fine wires M1A, M1B, M2A, and M2B, metal such as copper, aluminum, silver, molybdenum, or titanium, or an alloy containing these is preferably used. The metal fine wires M1A, M1B, M2A, and M2B may have a lamination layer structure of these metal materials, for example, a metal fine wire having a lamination layer structure of molybdenum/aluminum/molybdenum or a metal fine wire having a lamination layer structure of molybdenum/copper/molybdenum can be used.

For example, the metal fine wires M1A, M1B, M2A, and M2B may include metal oxide particles, a metal paste such as a silver paste and a copper paste, and metal nanowire particles such as silver nanowires and copper nanowires.

In order to improve the visibility of the metal fine wires M1A, M1B, M2A, and M2B, a blackening layer may be formed at least on the viewing, side surface of the metal fine wires M1A, M1B, M2A, and M2B. As the blackening layer, metal oxide, metal nitride, metal oxynitrides, and metal sulfide and the like are used, and typically, copper oxynitride, copper nitride, copper oxide, molybdenum oxide, and the like can be used.

The sizes of the first mesh pitch PA1 of the first mesh pattern MP1 that forms the first detection electrode portion 11A of the first electrode 11 and the second mesh pitch PA2 of the second mesh pattern MP2 that forms the second detection electrode portion 21A of the second electrode 21 are not particularly limited, but in view of improving the detection sensitivity capable of decreasing the parasitic capacitance of the first electrode 11 and the second electrode 21, the size is preferably 500 μm or more, more preferably 600 μm or more, and even more preferably 800 μm or more. The upper limit values of the first mesh pitch PA1 and the second mesh pitch PA2 is a width of the first electrode and a width of the second electrode and is preferably 1,600 μm or less. It is preferable that the mesh pitch is in the range of not exceeding the upper limit value, because the conduction of the electrode as the touch panel can be sufficiently secured. The size of the third mesh pitch PA3 of the third mesh pattern MP3 that is formed by combining the first detection electrode portions 11A of the first electrodes 11 the dummy pattern portions 11B in the first electrode, the second detection electrode portions 21A of the second electrodes 21, and the dummy pattern portions 21B in the second electrode with each other is not particularly limited, but in consideration of visibility, the size is preferably 50 to 400 μm and more preferably 150 to 300 μm.

In view of suppressing the moire of the display device, the first mesh cell C1 as the constitutional unit of the first mesh pattern MP1, the second mesh cell C2 as the constitutional unit of the second mesh pattern MP2, and the third mesh cell C3 as the constitutional unit of the third mesh pattern MP3 are preferably quadrangular shapes and particularly preferably rhombuses. The size of the acute angle of this rhombus can be, for example, 20 degrees to 88 degrees. The size of the acute angle of this rhombus is preferably 30 degrees to 85 degrees and more preferably 50 degrees to 80 degrees. The first mesh cell C1, the second mesh cell C2, and the third mesh cell C3 may be regular hexagons, regular triangles, and other polygons, other than rhombuses. It is preferable that the first mesh pattern MP1, the second mesh pattern MP2, and the third mesh pattern MP3 are respectively constituted by the plurality of first mesh cells C1 having the same shape, the plurality of second mesh cells C2 having the same shape, and the plurality of third mesh cells C3 having the same shape, because the design of the mesh patterns of the electrodes becomes easy. It is particularly preferable that the first mesh cells C1 and the second mesh cells C2 have the same shape, because the design of the mesh patterns of the electrodes becomes easy.

The third mesh pattern MP3 illustrated in FIG. 9 is a regular fixed pattern in which the plurality of third mesh cells C3 having the same shape are repeatedly arranged in the first direction D1 and the second direction D2, respectively, but the present invention is not limited thereto and may be an irregular pattern formed of the irregularly shaped third mesh cells C3.

The third mesh pattern MP3 has a polygonal shape having lengths of irregular sides of −10% to +10%, particularly, an irregular shape constituted by the quadrangular third mesh cells, with respect to the average value of the lengths of the sides of the plurality of third mesh cells C3 constituting the third mesh pattern MP3. According to this configuration, it is possible to achieve both moire suppression and color noise reduction in a case of being combined with a display device.

In a case of calculating the average value of the lengths of the sides of the plurality of third mesh cells C3, an average value of the lengths of the sides with respect to the plurality of third mesh cells C3 arranged in the area having the defined area can be calculated. For example, it is preferable to calculate the average value of the side length with respect to the plurality of third mesh cells C3 arranged in a region of 10 mm×10 mm.

In order to cause the third mesh pattern MP3 to be such an irregular pattern, the third mesh pattern MP3 can also be formed by using the first mesh pattern MP1 formed by the plurality of first mesh cells C1 having irregular shapes and the second mesh pattern MP2 formed by the plurality of second mesh cells C2 having irregular shapes. In this case, the first mesh pitch PA1 of the first mesh pattern MP1 can be defined by an average value of the distance in the first direction between centers of gravity of two first mesh cells C1 adjacent to each other in the first direction. The second mesh pitch PA2 of the second mesh pattern MP2 can be defined by the average value of the distances in the first direction between centers of gravity of two second mesh cells C2 adjacent to each other in the first direction.

In a case of calculating the average value of the distances between the centers of gravity of the mesh cells adjacent to each other, with respect to the plurality of first mesh cells C1 and the plurality of second mesh cells C2 arranged in the region having a predetermined area, an average value of the distances between the centers of gravity of the mesh cells adjacent to each other can be calculated. For example, it is preferable to calculate the average value of the distances between the centers of gravity of the mesh cells adjacent to each other of the plurality of first mesh cells C1 and the plurality of second mesh cells C2 arranged in the region of 10 mm×10 mm.

Also by causing the sizes or shapes (including angles) of the first mesh cells C1 as the constitutional units of the first mesh pattern MP1 and the second mesh cell C2 as the constitutional unit of the second mesh pattern MP2 to be different from each other, it is possible to constitute the third mesh pattern MP3 formed by the plurality of third mesh cells C3 having an irregular shape.

Subsequently, the method of forming the metal fine wires M1A, M1B, M2A, and M2B is described. As the method of forming these metal fine wires, for example, a plating method, a silver salt method, a vapor deposition method, a printing method, and the like can be suitably used.

The method of forming the metal fine wires by the plating method is described. For example, the fine metal wire can be constituted by using a metal plating film formed on the underlayer by performing electroless plating on the electroless plating underlayer. In this case, the metal fine wires are formed by forming a pattern shape on the substrate with catalyst ink containing at least metal fine particles, then immersing the substrate in an electroless plating bath, and forming a metal plating film. More specifically, the method for manufacturing a metal-coated substrate disclosed in JP2014-159620A can be used. The metal fine wires are formed by forming a pattern shape on the substrate with a resin composition having at least a functional group capable of interacting with a metal catalyst precursor, applying a catalyst or a catalyst precursor, immersing the substrate in an electrolessly plate bath, and forming a metal plating film. More specifically, the method of manufacturing a metal-coated substrate disclosed in JP2012-144761A can be applied.

The method of forming metal thin lines by the silver salt method is described. First, an exposure treatment is performed on a silver halide emulsion layer including silver halide by using an exposure pattern to be metal fine wires, and then a development treatment is performed, so as to form the fine metal wires. More specifically, methods of manufacturing metal fine wires disclosed in JP2012-006377A, JP2014-112512A, JP2014-209332A, JP2015-022397A, JP2016-192200A, and WO2016/157585A can be used.

The method of forming metal thin wires by the vapor deposition method is described. First, a copper thin layer can be formed by vapor deposition, and copper wires are formed of the copper thin layer by photolithography, so as to form metal fine wires. In addition to the vapor deposited copper thin layer, an electrolytic copper thin layer can be used as the copper thin layer. More specifically, a step of forming copper wires disclosed in JP2014-029614A can be used.

The method of forming the metal thin wire by the printing method is described. First, a conductive paste containing conductive powders is applied to a substrate so as to have the same pattern as the metal thin wires, and then the heat treatment is performed, so as to form the metal thin wires. In the pattern formation by using a conductive paste, for example, an inkjet method or a screen printing method can be used. More specifically, a conductive paste disclosed in JP2011-028985A can be used as the conductive paste.

<Protective Layer>

As the transparent protective layers 7A and 7B, organic films of gelatin, an acrylic resin, a urethane resin, or the like, and inorganic films of silicon dioxide or the like can be used, and the film thickness is preferably 10 nm to 100 nm.

If necessary, a transparent coating layer may be formed on the protective layer. As the transparent coat layer, an organic film of an acrylic resin, a urethane resin, or the like is used, and the film thickness thereof is preferably 1 μm to 100 μm.

As a material of the cover panel 3 constituting the touch panel 2, tempered glass, polycarbonate, polyethylene terephthalate, polymethyl methacrylate resin (PMMA), or the like can be used, and the thickness of the cover panel 3 is preferably 0.1 to 1.5 mm. A decorative layer that shields the edge part region S2 may be formed on the cover panel 3.

As the transparent adhesive 4 for bonding the conductive member 1 to the cover panel 3, an optical transparent pressures sensitive adhesive sheet (Optical Clear Adhesive: OCA) or an optical transparent pressures sensitive adhesive resin (Optical Clear Resin: OCR) can be used, and the preferable film thickness is 10 μm to 200 μm. As the optical transparent pressures sensitive adhesive sheet, for example, 8146 series manufactured by The 3M Company can be used.

<Edge Part Wire Insulating Film>

For the purpose of preventing shorting between edge part wires and corrosion of the edge part wires, an edge part wire insulating film may be formed on the first edge part wires 12 and the second edge part wires 22 as illustrated in FIG. 2. As the edge part wire insulating film, an organic film of an acrylic resin, a urethane resin, or the like is used, and the film thickness is preferably 1 μm to 30 μm. The edge part wire insulating film may be formed only on one of the first edge part wires 12 and the second edge part wires 22.

Embodiment 2

In Embodiment 1 described above, the dummy pattern portions 11B in the first electrode having the first dummy unit pattern T1B illustrated in FIG. 4 are arranged inside each mesh of the first mesh pattern MP1 formed of the first detection electrode portions 11A, and the dummy pattern portions 21B in the second electrode having the second dummy unit pattern T2B illustrated in FIG. 7 are arranged inside each mesh of the second mesh pattern MP2 formed of the second detection electrode portions 21A, but the first dummy unit pattern T1B and the second dummy unit pattern T2B are not limited to those illustrated in FIGS. 4 and 7.

Figure 10:
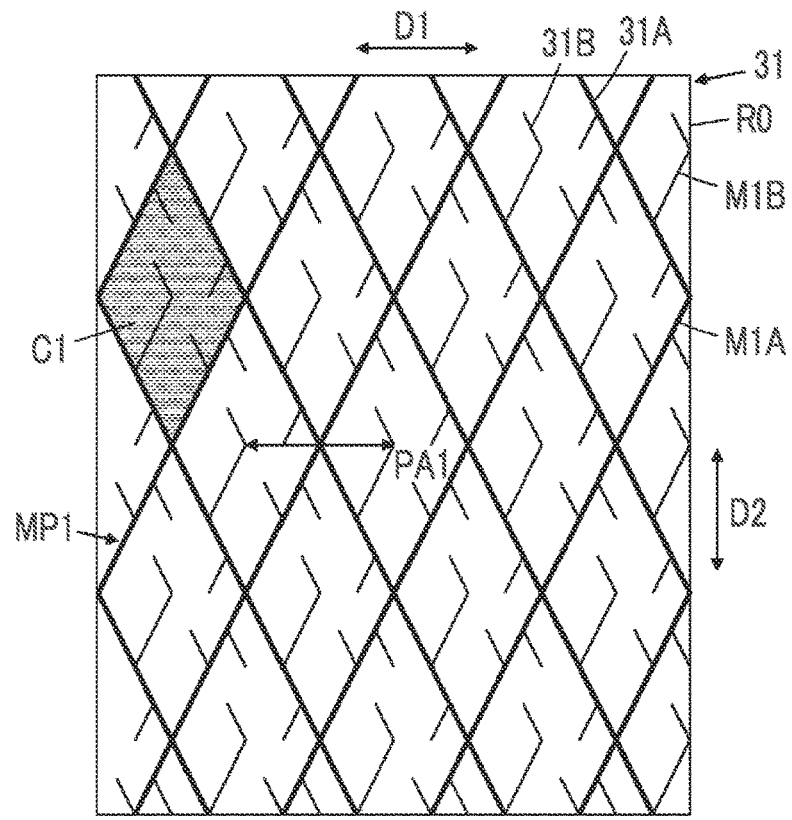
FIG. 10 is a partial plan view illustrating only a first electrode in an electrode intersection portion of a conductive member according to Embodiment 2 seen from viewing side.

FIG. 10 illustrates a partial plan view of only a first electrode 31 in an electrode intersection portion of a conductive member according to Embodiment 2 seen from a viewing side. The first electrode 31 is formed on the first surface 5A of the transparent insulating substrate 5 illustrated in FIG. 1.

The first electrode 31 has first detection electrode portions 31A which are drawn by relatively thick lines in FIG. 10 and dummy pattern portions 31B in the first electrode which are drawn by relatively thin lines in FIG. 10. The first detection electrode portions 31A and the dummy pattern portions 31B in the first electrode are respectively formed of the metal fine wires M1A and the metal fine wires M1B, and the dummy pattern portions 31B in the first electrode are arranged so as to be not electrically connected to the first detection electrode portions 31A and insulated from the first detection electrode portions 31A.

In the same manner as the first detection electrode portions 11A in Embodiment 1, the first detection electrode portions 31A form the first mesh pattern MP1 having the first mesh pitch PA1 to which the plurality of first mesh cells C1 are electrically connected, by using the rhombic first mesh cells C1 as constitutional units.

Figure 11:
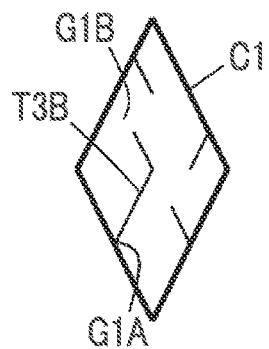
FIG. 11 is a plan view illustrating only a dummy pattern portion in the first electrode arranged inside each mesh cell of a first mesh pattern of the first electrode according to Embodiment 2 seen from viewing side.

The dummy pattern portions 31B in the first electrode having at least one third dummy unit pattern T3B as illustrated in FIG. 11 are arranged inside the first mesh cells C1 of the first mesh pattern MP1. The metal fine wires M1B constituting the dummy pattern portions 31B in the first electrode and the metal fine wires M1A constituting the first mesh cells C1 are spaced by the first gap G1A and the second gap G1B which is longer than the first gap G1A.

Figure 12:
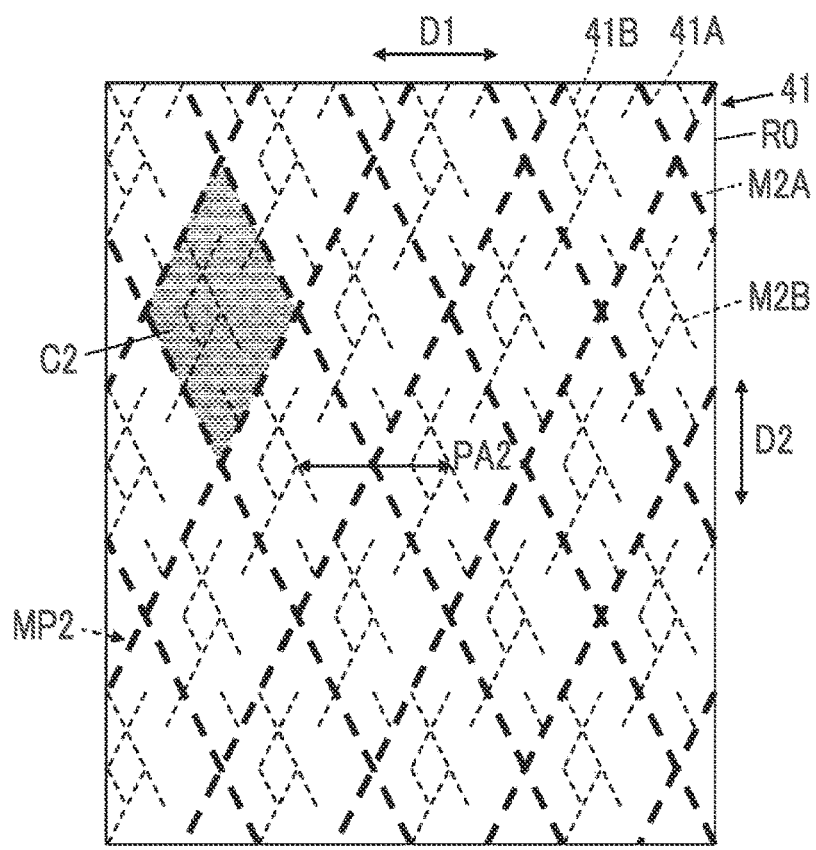
FIG. 12 is a partial plan view illustrating only a second electrode in the electrode intersection portion of the conductive member according to Embodiment 2 seen from viewing side.

FIG. 12 illustrates a partial plan view of only a second electrode 41 in the electrode intersection portion of the conductive member according to Embodiment 2 seen from a viewing side. The second electrode 41 is formed on the second surface 5B of the transparent insulating substrate 5 illustrated in FIG. 1.

The second electrode 41 has second detection electrode portions 41A drawn by relatively thick broken lines in FIG. 12 and dummy pattern portions 41B in the second electrode drawn by relatively thin broken lines in FIG. 12. The second detection electrode portions 41A and the dummy pattern portions 41B in the second electrode are respectively formed of the metal fine wires M2A and the metal fine wires M2B, and the dummy pattern portions 41B in the second electrode are arranged so as to be not electrically connected to the second detection electrode portions 41A and insulated from the second detection electrode portions 41A.

In the same manner as the first mesh pattern MP1, the second detection electrode portions 41A form the second mesh pattern MP2 having the second mesh pitch PA2 by using the rhombic second mesh cells C2 as the constitutional units.

Figure 13:
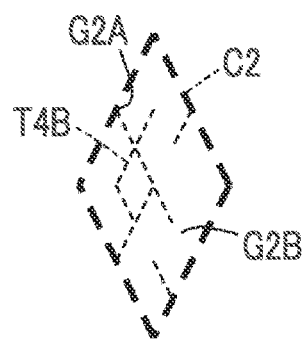
FIG. 13 is a plan view illustrating a dummy pattern portion in the second electrode arranged inside each mesh cell of a second mesh pattern of the second electrode in Embodiment 2 seen from viewing side.

Also, the dummy pattern portions 41B in the second electrode which has a fourth dummy unit pattern T4B as illustrated in FIG. 13 are arranged inside the second mesh cell C2 of the second mesh pattern MP2. The metal fine wires M2B constituting the dummy pattern portions 41B in the second electrode and the metal fine wires M2A constituting the second mesh cells C2 are spaced by the first gap G2A and the second gap G2B which is longer than the first gap G2A.

The third dummy unit pattern T3B and the fourth dummy unit pattern T4B used in Embodiment 2 have pattern shapes different from the first dummy unit pattern T1B and the second dummy unit pattern T2B in Embodiment 1 as illustrated in FIGS. 4 and 7. The third dummy unit pattern T3B is a pattern in which the metal fine wires M1B that form the dummy pattern portions 31B in the first electrode intersect with each other in a cross shape, and the fourth dummy unit pattern T4B has points at which the metal fine wires M2B that form the dummy pattern portions 41B in the second electrode intersect with each other in a cross shape.

Figure 14:
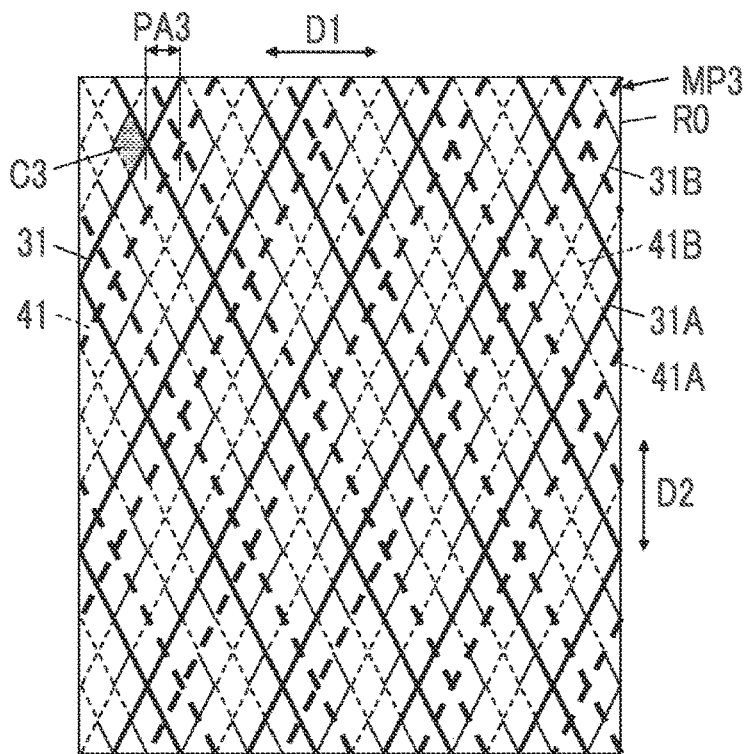
FIG. 14 is a partial plan view illustrating a third mesh pattern formed of the first electrode and the second electrode in the electrode intersection portion of the conductive member according to Embodiment 2 seen from viewing side.

Also in Embodiment 2, in the same manner as Embodiment 1, the second mesh pattern MP2 is arranged so as to be deviated by ¼ of the first mesh pitch PA1 such that a center of gravity of the first mesh cell C1 and a peak of the second mesh cell C2 are overlapped with each other, with respect to the first mesh pattern MP1. Accordingly, in the region R0 in the electrode intersection portion, in a case where the first electrodes 31 and the second electrodes 41 are observed on the viewing side, as illustrated in FIG. 14, the first detection electrode portions 31A of the first electrodes 31 and the dummy pattern portions 31B in the first electrode, and the second detection electrode portions 41A of the second electrodes 41 and the dummy pattern portions 41B in the second electrode are combined with each other, so as to form the third mesh pattern MP3 constituted by rhombic third mesh cells C3, in the same manner as in Embodiment 1. The second mesh pitch PA2 has a value of ¼ of the first mesh pitch PA1 and the second mesh pitch PA2 of the first mesh pattern MP1 and the second mesh pattern MP2.

In the same manner, even in a case where the dummy pattern portions 31B in the first electrode that have the third dummy unit pattern T3B illustrated in FIG. 11 are arranged inside the first mesh cells C1 of the first mesh pattern MP1, and the dummy pattern portions 41B in the second electrode that have the fourth dummy unit pattern T4B illustrated in FIG. 13 are arranged inside the second mesh cell C2 of the second mesh pattern MP2, the third mesh pattern MP3 having the third mesh pitch PA3 can be formed.

Therefore, the first mesh pitch PA1 of the first mesh pattern MP1 that is formed by the first detection electrode portions 31A of the first electrodes 31 that is used for the detection of a touch operation and the second mesh pitch PA2 of the second mesh pattern MP2 that is formed by the second detection electrode portions 41A of the second electrodes 41 can be set to be four times of the size of the third mesh pitch PA2 of the third mesh pattern MP3.

Accordingly, in the same manner as in Embodiment 1, the presence of the metal fine wires M1A, M1B, M2A, and M2B become invisible in a case of being observed on the viewing side, the sizes and the angles of the third mesh cell C3 can be selected such that the generation of the moire is decreased in a case where the display device is used by being combined with the touch panel 2, so as to design the third mesh pattern MP3, and thus the parasitic capacitances of the first detection electrode portions 31A and the second detection electrode portions 41A can be reduced. Therefore, even in a case where a detection electrode portion with a large mesh pattern having a wide pitch which has less parasitic capacitance and high detection sensitivity is used, the visibility can be improved, and also in a case where the touch panel 2 and the display device are combined with each other to be used, the generation of the moire can be suppressed.

Embodiment 3

Figure 15:
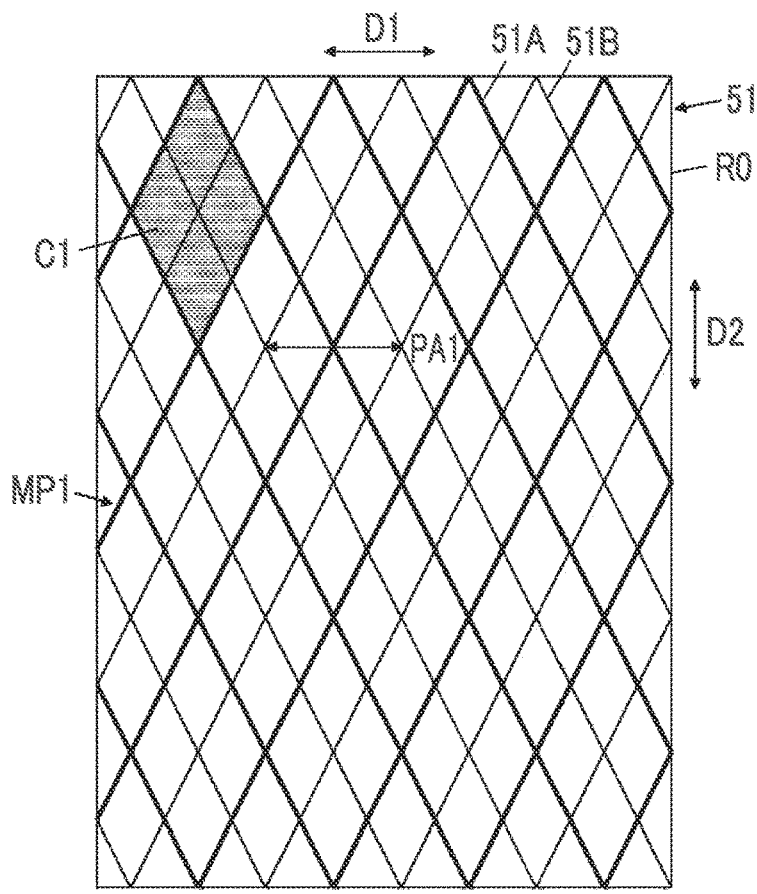
FIG. 15 is a partial plan view illustrating only a first electrode in an electrode intersection portion of a conductive member according to Embodiment 3 seen from viewing side.

FIG. 15 illustrates a partial plan view of only a first electrode 51 in an electrode intersection portion of a conductive member according to Embodiment 3 seen from a viewing side. The first electrode 51 is formed on the first surface 5A of the transparent insulating substrate 5 illustrated in FIG. 1.

The first electrode 51 has first detection electrode portions 51A which are drawn by relatively thick lines in FIG. 15 and dummy pattern portions 51B in the first electrode which are drawn by relatively thin lines in FIG. 15. The first detection electrode portions 51A and the dummy pattern portions 51B in the first electrode are respectively formed of the metal fine wires M1A and the metal fine wires M1B, and the dummy pattern portions 51B in the first electrode are arranged so as to be not electrically connected to the first detection electrode portions 51A and insulated from the first detection electrode portions 51A.

In the same manner as the first detection electrode portions 11A in Embodiment 1, the first detection electrode portions 51A form the first mesh pattern MP1 having the first mesh pitch PA1 by using the rhombic first mesh cells C1 as constitutional units and electrically connecting the plurality of first mesh cells C1.

Figure 16:
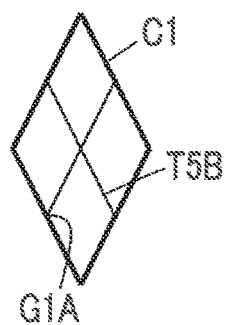
FIG. 16 is a plan view illustrating only a dummy pattern portion in the first electrode arranged inside each mesh cell of a first mesh pattern of the first electrode according to Embodiment 3 seen from viewing side.

Also, the dummy pattern portions 51B in the first electrode which has a fifth dummy unit pattern T5B as illustrated in FIG. 16 are arranged inside the first mesh cell C1 of the first mesh pattern MP1. The metal fine wires M1B constituting the dummy pattern portions 51B in the first electrode and the metal fine wires M1A constituting the first mesh cells C1 are spaced by the first gap G1A.

Figure 17:
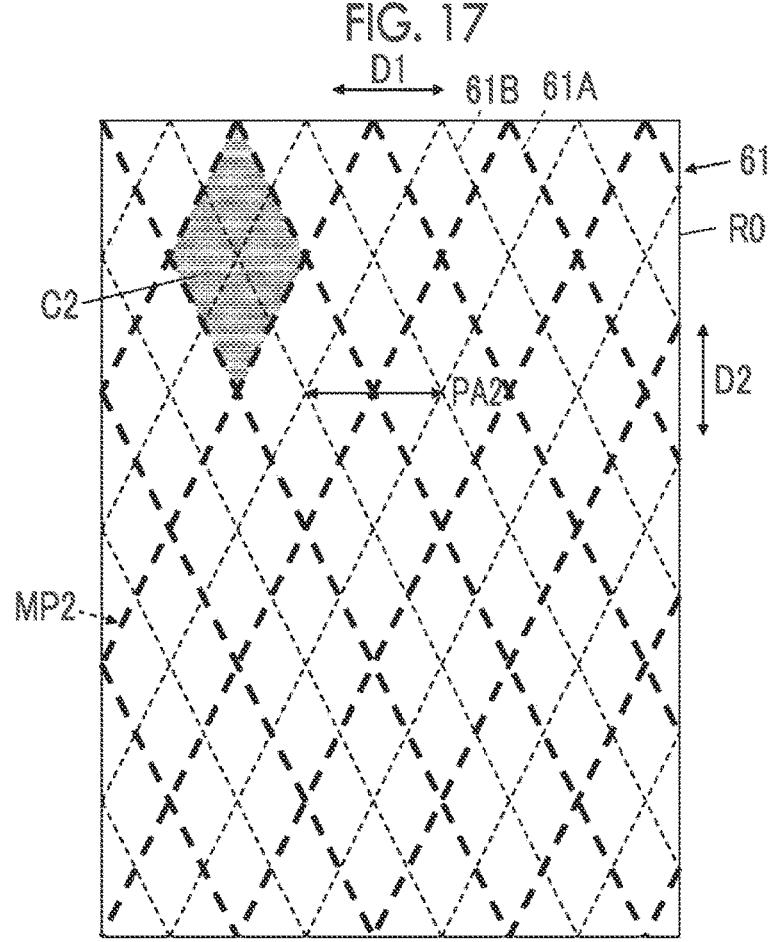
FIG. 17 is a partial plan view illustrating only a second electrode in the electrode intersection portion of the conductive member according to Embodiment 3 seen from viewing side.

FIG. 17 illustrates a partial plan view of only a second electrode 61 in the electrode intersection portion of the conductive member according to Embodiment 3 seen from a viewing side. The second electrode 61 is formed on the second surface 5B of the transparent insulating substrate 5 illustrated in FIG. 1.

The second electrode 61 has second detection electrode portions 61A drawn by relatively thick broken lines in FIG. 17 and dummy pattern portions 61B in the second electrode drawn by relatively thin broken lines in FIG. 17. The second detection electrode portions 61A and the dummy pattern portions 61B in the second electrode are respectively formed of metal fine wires M2A and metal fine wires M2B, and the dummy pattern portions 61B in the second electrode are arranged so as be not electrically connected to the second detection electrode portions 61A and be insulated from the second detection electrode portions 61A.

In the same manner as the first mesh pattern MP1, the second detection electrode portions 61A form the second mesh pattern MP2 having the second mesh pitch PA2 by using the rhombic second mesh cells C2 as constitutional units and electrically connecting the plurality of second mesh cells C2.

Figure 18:
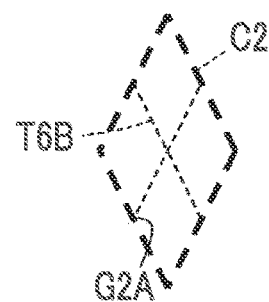
FIG. 18 is a plan view illustrating a dummy pattern portion in the second electrode arranged inside each mesh cell of a second mesh pattern of the second electrode in Embodiment 3 seen from viewing side.

Also, the dummy pattern portions 61B in the second electrode which has a sixth dummy unit pattern T6B as illustrated in FIG. 18 are arranged inside each mesh of the second mesh pattern MP2. The metal fine wires M2B constituting the dummy pattern portions 61B in the second electrode and the metal fine wires M2A constituting the second mesh cells C2 are spaced by the first gap G2A.

The fifth dummy unit pattern T5B and the sixth dummy unit pattern T6B used in Embodiment 3 have pattern shapes different from the first dummy unit pattern T1B and the second dummy unit pattern T2B in Embodiment 1 as illustrated in FIGS. 4 and 7. The fifth dummy unit pattern T5B and the sixth dummy unit pattern T6B have the shape identical to each other, and the metal fine wires M1B that form, the dummy pattern portions 51B in the first electrode and the metal fine wires M2B that form the dummy pattern portions 61B in the second electrode respectively have points at which the metal fine wires intersect with each other in a cross shape.

Figure 19:
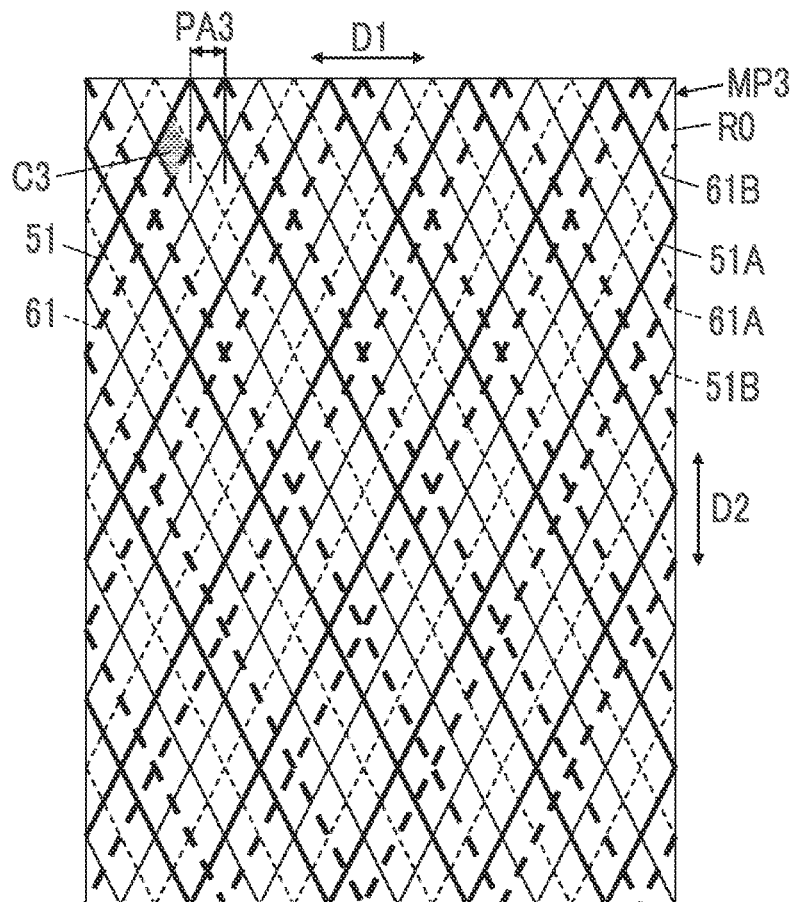
FIG. 19 is a partial plan view illustrating a third mesh pattern formed of the first electrode and the second electrode in the electrode intersection portion of the conductive member according to Embodiment 3 seen from viewing side.

Also in Embodiment 3, in the same manner as Embodiment 1, the second mesh pattern MP2 is arranged so as to be deviated by ¼ of the first mesh pitch PA1 with respect to the first mesh pattern MP1. Accordingly, in the region R0 in the electrode intersection portion, in a case where the first electrodes 51 and the second electrodes 61 are observed on the viewing side, as illustrated in FIG. 19, the first detection electrode portions 51A of the first electrodes 51 and the dummy pattern portions 51B in the first electrode, and the second detection electrode portions 61A of the second electrodes 61 and the dummy pattern portions 61B in the second electrode are combined with each other, so as to form the third mesh pattern MP3 using the rhombic third mesh cell C3 as constitutional units and having the third mesh pitch PA3, in the same manner as in Embodiment 1. The third mesh pitch PA3 has a value of ¼ of the first mesh pitch PA1 and the second mesh pitch PA2 of the first mesh pattern MP1 and the second mesh pattern MP2.

In the same manner, even in a case where the dummy pattern portions 51B in the first electrode that have the fifth dummy unit pattern T5B illustrated in FIG. 16 are arranged inside the first mesh cells C1 of the first mesh pattern MP1, and the dummy pattern portions 61B in the second electrode that have the sixth dummy unit pattern T6B illustrated in FIG. 18 are arranged inside the second mesh cell C2 of the second mesh pattern MP2, the third mesh pattern MP3 having the third mesh pitch PA3 can be formed.

Therefore, the first mesh pitch PA1 of the first mesh pattern MP1 that is formed by the first detection electrode portions 51A of the first electrodes 51 that is used for the detection of a touch operation and the second mesh pitch PA2 of the second mesh pattern MP2 that is formed by the second detection electrode portions 61A of the second electrodes 61 can be set to be four times of the size of the third mesh pitch PA3 of the third mesh pattern MP3.

Accordingly, in the same manner as in Embodiment 1, the presence of the metal fine wires M1A, M1B, M2A, and M2B become invisible in a case of being observed on the viewing side, the sizes and the angles of the third mesh cell C3 can be selected such that the generation of the moire is decreased in a case where the display device is used by being combined with the touch panel 2, so as to design the third mesh pattern MP3, and thus the parasitic capacitances of the first detection electrode portions 51A and the second detection electrode portions 61A can be reduced. Therefore, even in a case where a detection electrode portion with a large mesh pattern having a wide pitch which has less parasitic capacitance and high detection sensitivity is used, the visibility is improved, and also in a case where the touch panel 2 and the display device are combined with each other to be used, the generation of the moire can be suppressed.

Embodiment 4

Figure 20:
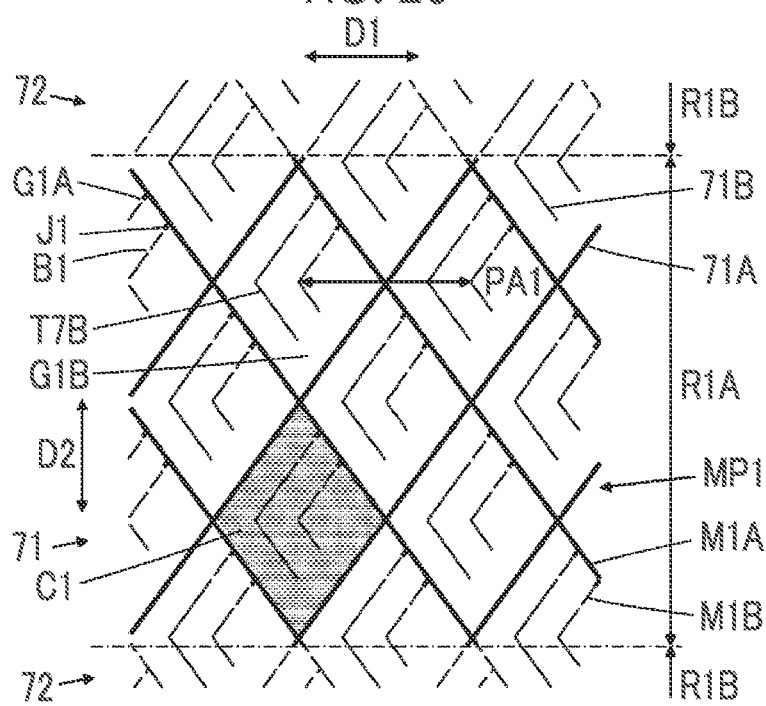
FIG. 20 is a plan view illustrating a first electrode and a first dummy electrode in an electrode intersection portion of a conductive member according to Embodiment 4 seen from viewing side.

FIG. 20 illustrates a partial plan view of a first electrode 71 and a first dummy electrode 72 in an electrode intersection portion of a conductive member according to Embodiment 4 seen from a viewing side. The first electrode 71 and the first dummy electrodes 72 are formed on the first surface 5A of the transparent insulating substrate 5 illustrated in FIG. 1.

The first electrode 71 is arranged in a region R1A formed along the first direction D1, and the first dummy electrode 72 is arranged in a region R1B adjacent to the region R1A. That is, the first dummy electrode 72 is arranged between the first electrodes 71 adjacent to each other. The first electrode 71 and the first dummy electrode 72 are arranged so as to be insulated from each other.

The first electrode 71 has first detection electrode portions 71A which are drawn by relatively thick lines in FIG. 20 and dummy pattern portions 71B in the first electrode which are drawn by relatively thin lines in FIG. 20. The first detection electrode portions 71A and the dummy pattern portions 71B in the first electrode are respectively formed of the metal fine wires M1A and the metal fine wires M1B, and the dummy pattern portions 71B in the first electrode are arranged so as to be not electrically connected to the first detection electrode portions 71A and insulated from the first detection electrode portions 71A.

The first dummy electrode 72 has the same pattern as that of the first electrode 71, but is a floating electrode, and does not function as a sensor in the touch panel 2.

In the same manner as the first detection electrode portions 11A in Embodiment 1, the first detection electrode portions 71A form the first mesh pattern MP1 having the first mesh pitch PA1 by using the rhombic first mesh cells C1 as constitutional units and electrically connecting the plurality of first mesh cells C1.

Also, the dummy pattern portions 71B in the first electrode which has a seventh dummy unit pattern T7B are arranged inside the first mesh cell C1 of the first mesh pattern MP1. The metal fine wires M1B constituting the dummy pattern portions 71B in the first electrode and the metal fine wires M1A constituting the first mesh cells C1 are spaced by the first gap G1A. The first electrode 71 has a portion in which the metal fine wire M1A and the metal fine wire M1B are spaced from each other by a second gap G1B that is longer than the first gap G1A.

Figure 21:
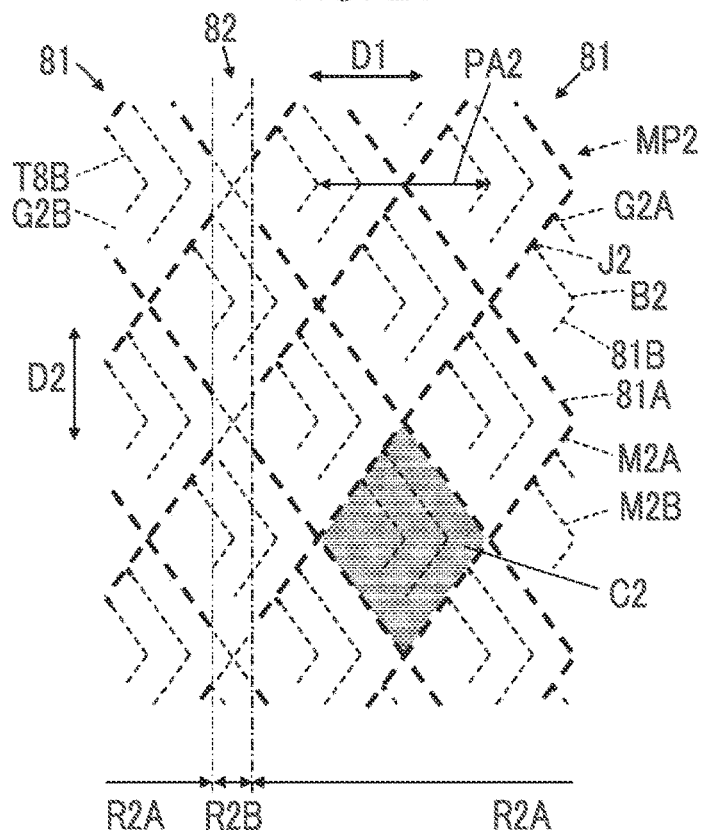
FIG. 21 is a plan view illustrating a second electrode and a second dummy electrode in the electrode intersection portion of the conductive member according to Embodiment 4 seen from viewing side.

FIG. 21 illustrates a partial plan view of a second electrode 81 and a second dummy electrode 82 in an electrode intersection portion of a conductive member according to Embodiment 4 seen from a viewing side. The second electrode 81 and the second dummy electrodes 82 are formed on the second surface 5B of the transparent insulating substrate 5 illustrated in FIG. 1. The second electrode 81 is arranged in a region R2A formed along the second direction D2, and the second dummy electrode 82 is arranged in a region R2B adjacent to the region R2A. That is, the second dummy electrode 82 is arranged between the second electrodes 81 adjacent to each other. The second electrode 81 and the second dummy electrode 82 are arranged so as to be insulated from each other.

The second electrode 81 has second detection electrode portions 81A drawn by relatively thick broken lines in FIG. 21 and dummy pattern portions 81B in the second electrode drawn by relatively thin broken lines in FIG. 21. The second detection electrode portions 81A and the dummy pattern portions 81B in the second electrode are respectively formed of metal fine wires M2A and metal fine wires M2B, and the dummy pattern portions 81B in the second electrode are arranged so as be not electrically connected to the second detection electrode portions 81A and to be insulated from the second detection electrode portions 81A.

The second dummy electrode 82 has the same configuration as that of the first electrode 81, but is a floating electrode, and does not function as a sensor in the touch panel 2.

In the same manner as the first mesh pattern MP1, the second detection electrode portions 81A form the second mesh pattern MP2 having the second mesh pitch PA2 by using the rhombic second mesh cells C2 as constitutional units and electrically connecting the plurality of second mesh cells C2.

Also, the dummy pattern portions 81B in the second electrode which has an eighth dummy unit pattern T8B are arranged inside each mesh of the second mesh pattern MP2 The metal fine wires M2B constituting the dummy pattern portions 81B in the second electrode and the metal fine wires M2A constituting the second mesh cells C2 are spaced by the first gap G2A. The second electrode 81 has a portion in which the metal fine wire M2A and the metal fine wire M2B are spaced from each other by a second gap G2B that is longer than the first gap G2A.

The seventh dummy unit pattern T7B used in Embodiment 4 has a pattern shape different from the first dummy unit pattern T1B in Embodiment 1 as illustrated in FIG. 4. As illustrated in FIG. 20, the seventh dummy unit pattern 17B is a pattern in which the metal fine wires M1B that do not include a metal fine wire do not intersect with each other in a cross shape and do not completely cross with each other, and has disconnected portions B1 in which the metal fine wires M1B are disconnected. The length of the disconnected portion B1 is 0.5 μm to 30 μm and preferably 5 μm to 20 μm.

In the first mesh cell C1, projection portions J1 projecting from one sides of the first mesh cells C1 are formed so as to abut end portions of the metal fine wires M1B that form the dummy pattern portions 71B in the first electrode. The end portions of the metal fine wires M1B and the end portions of the projection portion J1 are spaced from each other by the first gap G1A. The first electrode 71 has a portion in which the metal fine wire M1A and the metal fine wire M1B are spaced from each other by the second gap G1B that is longer than the first gap G1A. In view of reducing the parasitic capacitance of the electrode, the length of the projection portion J1 is preferably 50 μm or less and particularly preferably 10 μm to 30 μm. Otherwise, the length of the projection portion J1 is preferably 1/10 or less of a length of one side of the first mesh cell C1 and more preferably 1/100 to 1/20.

In the same manner as in the seventh dummy unit pattern T7B, the eighth dummy unit pattern T8B used in Embodiment 4 is a pattern in which the metal fine wires M2B that do not include a metal fine wire do not intersect with each other in a cross shape and do not completely cross with each other, and has the disconnected portions B2 in which the metal fine wires M2B are disconnected. The length of the disconnected portion B2 is 0.5 μm to 30 μm and preferably 5 μm to 20 μm.

In the second mesh cell C2, projection portions J2 projecting from one sides of the second mesh cells C2 are formed so as to abut end portions of the metal fine wires M2B that form the dummy pattern portions 81B in the second electrode. The end portions of the metal fine wires M2B and the end portions of the projection portion J2 are spaced from each other by the first gap G2A. In view of reducing the parasitic capacitance of the electrode, the length of the projection portion J2 is preferably 50 μm or less and particularly preferably 10 μm to 30 μm. Otherwise, the length of the projection portion J2 is preferably 1/10 or less of a length of one side of the second mesh cell C2 and more preferably 1/100 to 1/20.

Figure 22:
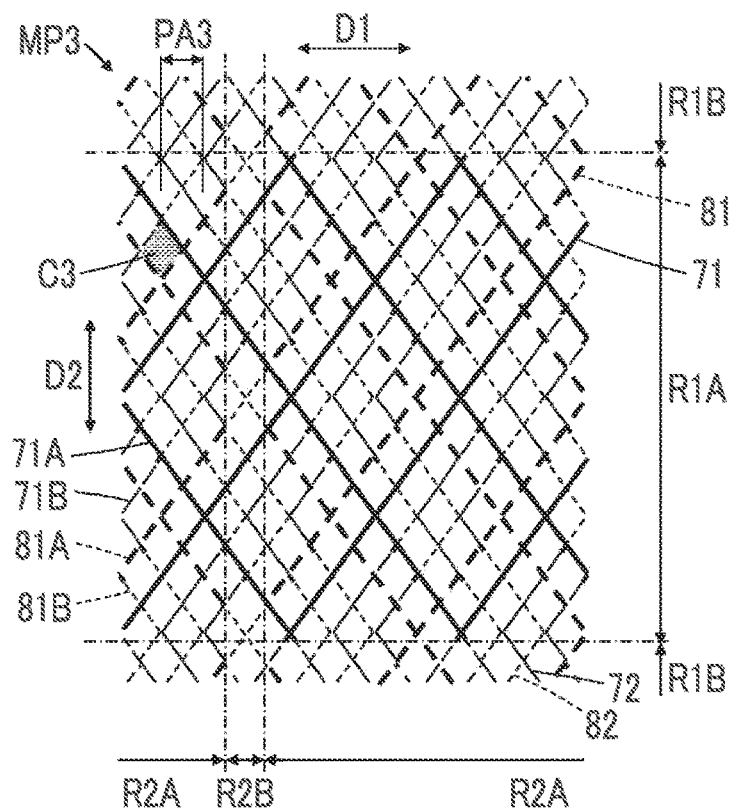
FIG. 22 is a partial plan view illustrating a third mesh pattern formed of the first electrode and the second electrode in the electrode intersection portion of the conductive member according to Embodiment 4 seen from viewing side.

Also in Embodiment 4, in the same manner as Embodiment 1, the second mesh pattern MP2 is arranged so as to be deviated by ¼ of the first mesh pitch PA1 with respect to the first mesh pattern MP1. Accordingly, in the electrode intersection portion, in a case where the first electrodes 71 and the second electrodes 81 are observed on the viewing side, as illustrated in FIG. 22, the first detection electrode portions 71A of the first electrodes 71 and the dummy pattern portions 71B in the first electrode, and the second detection electrode portions 81A of the second electrodes 81 and the dummy pattern portions 81B in the second electrode are combined with each other, so as to form the third mesh pattern MP3 using the rhombic third mesh cell C3 as constitutional units and having the third mesh pitch PA3, in the same manner as in Embodiment 1. The third mesh pitch PA3 has a value of ¼ of the first mesh pitch PA1 and the second mesh pitch PA2 of the first mesh pattern MP1 and the second mesh pattern MP2.

In the same manner, even in a case where the dummy pattern portions 71B in the first electrode that have the seventh dummy unit pattern T7B illustrated in FIG. 20 are arranged inside the first mesh cells C1 of the first mesh pattern MP1, and the dummy pattern portions 81B in the second electrode that have the eighth dummy unit pattern T8B illustrated in FIG. 21 are arranged inside the second mesh cell C2 of the second mesh pattern MP2, the third mesh pattern MP3 having the third mesh pitch PA3 can be formed.

Therefore, the first mesh pitch PA1 of the first mesh pattern MP1 that is formed by the first detection electrode portions 71A of the first electrodes 71 that is used for the detection of a touch operation and the second mesh pitch PA2 of the second mesh pattern MP2 that is formed by the second detection electrode portions 81A of the second electrodes 81 can be set to be four times of the size of the third mesh pitch PA3 of the third mesh pattern MP3.

Accordingly, in the same manner as in Embodiment 1, the presence of the metal fine wires M1A, M1B, M2A, and M2B become invisible in a case of being observed on the viewing side, the sizes and the angles of the third mesh cell C3 can be selected such that the generation of the moire is decreased in a case where the display device is used by being combined with the touch panel 2, so as to design the third mesh pattern MP3, and thus the parasitic capacitances of the first detection electrode portions 71A and the second detection electrode portions 81A can be reduced. Therefore, even in a case where a detection electrode portion with a large mesh pattern having a wide pitch which has less parasitic capacitance and high detection sensitivity is used, the visibility is improved, and also in a case where the touch panel 2 and the display device are combined with each other to be used, the generation of the moire can be suppressed.

The present invention basically has the configuration as above. In the above, the conductive member and the touch panel according to the embodiment of the present invention have been described, but the present invention is not limited to the above embodiments, and it is obvious that various improvements and modifications may be performed without departing from the gist of the present invention.

EXAMPLES

Hereinafter, the present invention is specifically described with reference to the examples. The materials, amounts used, proportions, treatment details, treatment procedures, or the like described in the following examples can be appropriately changed without departing from the gist of the present invention, and the scope of the present invention is not construed by the following examples restrictively <Manufacturing of Touch Panel>

Various photo masks with different exposure patterns were prepared, and a first electrode and a second electrode formed of fine metal wires were respectively formed on both sides of the transparent insulating substrate, so as to manufacture a conductive member. The metal thin wires were formed by silver wires, by using a polyethylene terephthalate film having a thickness of 38 µm as a transparent insulating substrate.

The manufactured conductive member was bonded to a tempered glass having a thickness of 1.1 mm as a cover panel as a cover panel, by using an optical transparent pressures sensitive adhesive sheet having a thickness of 75 µm of 8146-4 (model number) manufactured by The 3M Company, so as to manufacture a touch panel having the structure illustrated in FIG. 1.

<Touch Sensitivity Evaluation>

A front end section of a touch pen in which an outer diameter of the front end section was 1.0 mm was brought in contact with the manufactured touch panel so as to perform the sensitivity evaluation of the touch panel. At this point, based on the position detection accuracy with respect to the contact position between the surface of the touch panel and the front end section of the touch pen, evaluation standards of A to C were determined as follows. In a case where the evaluation was A or B, it is determined that detection accuracy was not problematic in practical use.

A: The position detection accuracy was less than 1.0 mm, and correct position detection was able to be made.

B: The position detection accuracy was 1.0 mm or more and less than 2.0 mm, there was no problem in practical use.

C: The position detection accuracy was 2.0 mm or more, correct position detection was not able to be made.

<Visibility Evaluation>

The manufactured touch panel was observed with bare eyes of 10 observers at a position spaced by 5 cm from the front surface of the touch panel so as to evaluate whether metal fine wires were recognized. With respect to the visibility, the evaluation standards of A to C were determined as follows, the most frequent evaluation result among the evaluation results of 10 observers was set as a final evaluation result with respect to the touch panel. In a case where the evaluation was A or B, it is determined that visibility was not problematic in practical use.

A: The metal fine wire was not recognized at all.

B: The metal fine wire was slightly recognized, but was not problematic in practical use.

C: The metal fine wire was clearly recognized.

<Moire Evaluation>

The image displayed in a state in which the manufactured touch panel was arranged on the liquid crystal display module and the liquid crystal display module performed image display on the entire surface was observed with the bare eyes of 10 observers, so as to evaluate whether the moire generated on the displayed image was recognized. With respect to the generation of the moire, the evaluation standards of A to C were determined as follows, the most frequent evaluation result among the evaluation results of 10 observers was set as a final evaluation result with respect to the touch panel. In a case where the evaluation was A or B, it is determined that the moire was not problematic in practical use.

A: The moire was not recognized.

B: The moire was slightly recognized, but was not problematic in practical use.

C: The moire was noticeable.

Here, the method of manufacturing the conductive member is specifically described.

(Preparation of Silver Halide Emulsion)

The following solutions 2 and 3 were added by an amount corresponding to 90% each to the following solution 1 kept at a temperature of 38° C., and pH (potential of hydrogen) of 4.5 with stirring over 20 minutes, so as to form nuclear particles of 0.16 µm. Subsequently, the following solutions 4 and 5 were added over 8 minutes, and the following solutions 2 and 3 were added each by an amount of the remaining 10% over two minutes, so as to grow particles to 0.21 µm. Further, 0.15 g of potassium iodide was added and aged for five minutes so as to complete particle formation.

Solution 1:

Water . . . 750 ml

Gelatin . . . 9 g

Sodium chloride . . . 3 g 1,3-Dimethylimidazolidine-2-thione . . . 20 mg

Sodium benzenethiosulfonate . . . 10 mg

Citric acid . . . 0.7 g

Solution 2:

Water . . . 300 ml

Silver nitrate . . . 150 g

Solution 3:

Water . . . 300 ml

Sodium chloride . . . 38 g

Potassium bromide . . . 32 g

Potassium hexachloro iridiumate (III) (0.005% KCl 20% aqueous solution) . . . 8 ml Hexachlororhodate ammonium (0.001% NaCl 20% aqueous solution) . . . 10 ml Solution 4:

Water . . . 100 ml
Silver nitrate . . . 50 g
Solution 5:
Water . . . 100 ml
Sodium chloride . . . 13 g
Potassium bromide . . . 11 g
Yellow blood salt . . . 5 mg Thereafter, washing with water was performed by a flocculation method according to a general method. Specifically, the temperature was decreased to 35° C., 3 liters of distilled water was added, and sulfuric acid was used to lower the pH until the silver halide was precipitated (in the range of pH 3.6±0.2). Next, about 3 liters of the supernatant was removed (first washing with water). Additional 3 liters of distilled water was added, and sulfuric acid was added, until the silver halide had precipitated. Again, 3 liters of the supernatant was removed (second washing with water). The same operation as the second washing with water was further repeated one more time (third washing with water) to complete a water washing-desalting step. The emulsion after washing and desalting was adjusted to pH 6.4 and pAg 7.5, 3.9 g of gelatin, 10 mg of sodium benzenethiosulfonate, 3 mg of sodium benzenethiosulfinate, 15 mg of sodium thiosulfate, and 10 mg of chloroauric acid were added, chemical sensitization was performed so as to obtain the optimum sensitivity at 55° C., and 100 mg of 1,3,3a,7-tetraazaindene as a stabilizer and 100 mg of PROXEL (trade name, manufactured by ICI Co., Ltd.) as a preservative were added. The finally obtained emulsion was a silver iodochlorobromide cubic grain emulsion including 0.08 mol % of silver iodide, having a proportion of silver chlorobromidea of 70 mol % of silver chloride and 30 mol % of silver bromide, and having an average particle diameter of 0.22 µm and a coefficient of variation of 9%.

(Preparation of Composition for Forming Photosensitive Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, 0.90 g/mol Ag of 2,4-dichloro-6-hydroxy-1,3,5-triazine sodium salt, and a slight amount of a hardener were added to the above emulsion, and pH of the coating solution was adjusted to 5.6 by using citric acid.

A polymer latex containing a polymer represented by (P-1) and dialkylphenyl PEO sulfate ester as a dispersing agent with respect to gelatin contained in the above coating solution (a mass ratio of dispersing agent/polymer was 2.0/100=0.02) was added such that polymer/gelatin (mass ratio)=0.5/1 was satisfied.

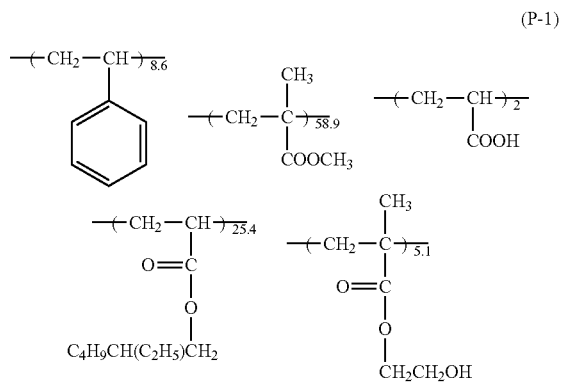

(P-1)

EPOXY RESIN DY 022 (trade name, manufactured by Nagase ChemteX Corp.) was added as a crosslinking agent. The addition amount of the crosslinking agent was adjusted such that the amount of the crosslinking agent in the photosensitive layer described below was 0.09 g/m².

The composition for forming a photosensitive layer was prepared as above.

The polymer represented by (P-1) described above was synthesized with reference to JP3305459B and JP3754745B.

(Photosensitive Layer Formation Step)

Both sides of the transparent insulating substrate were coated with the above polymer latex, so as to provide an undercoat layer having a thickness of 0.05 µm. As the transparent insulating substrate, polyethylene terephthalate film of 38 µm (manufactured by Fujifilm Corporation) was used.

Next, an antihalation layer was formed of a mixture of the above polymer latex, gelatin, and a dye having an optical density of about 1.0 and being decolorized by alkali of a developer was provided on the undercoat layer. The mixing mass ratio (polymer/gelatin) of the polymer and the gelatin in the antihalation layer was 2/1, and the content of the polymer was 0.65 g/m².

The antihalation layer was coated with the composition for forming a photosensitive layer and was further coated with a composition obtained by mixing the polymer latex, gelatin, EPOCROSS K-2020E (trade name, manufactured by Nippon Shokubai Co., Ltd., oxazoline-based crosslinking reactive polymer latex) (crosslinkable group, oxazoline group)), and SNOWTEX C (registered trademark, trade name, manufactured by Nissan Chemical Industries, Ltd., colloidal silica) by a solid content mass ratio (polymer/gelatin/EPOCROSS K-2020E/SNOWTEX C (registered trademark)) of 1/1/0.3/2 such that the amount of gelatin was 0.08 g/m², so as to obtain a support of which photosensitive layers were formed on both sides. A support having photosensitive layers formed on both sides is referred to as a film A. The formed photosensitive layer had a silver content of 6.2 g/m² and a gelatin content of 1.0 g/m².

(Exposure and Development Step)

For example, a first photo mask for forming a first electrode having a pattern as illustrated in FIG. 3 and a second photo mask for forming a second electrode having a pattern as illustrated in FIG. 6 were respectively formed, the first photo mask and the second photo mask were arranged on both sides of the film A, and the both sides were simultaneously exposed with parallel light by using a high pressure mercury lamp as a light source.

After the exposure, development was performed by using the following developer, and development was performed by using a fixing solution (trade name, N3X-R for CN16X, manufactured by Fujifilm Corporation). Rinsing with pure water was performed, and the water was dried, so as to obtain a support in which metal fine wires made of Ag (silver) and gelatin layers were formed on both surfaces. The gelatin layer was formed between the metal wires. The obtained film was referred to as a film B.

(Composition of Developer)

The following compounds were contained in 1 liter (L) of the developer.

Hydroquinone . . . 0.037 mol/L
N-methylaminophenol . . . 0.016 mol/L
Sodium metaborate . . . 0.140 mol/L
Sodium hydroxide . . . 0.360 mol/L
Sodium bromide . . . 0.031 mol/L
Potassium metabisulfite . . . 0.187 mol/L (Gelatin Degradation Treatment)

The film B was immersed in an aqueous solution (concentration of proteolytic enzyme: 0.5 mass %, solution temperature: 40° C.) of a proteolytic enzyme (BIOPLASE AL-15FG manufactured by Nagase ChemteX Corp.) in an aqueous solution for 120 seconds. The film B was extracted from the aqueous solution, immersed in warm water (solution temperature: 50° C.) for 120 seconds, and washed. The film after gelatin degradation treatment is referred to as a film C.

<Resistance Reduction Treatment>

A calender treatment was performed on the film C by using a calender device equipped with metal rollers at a pressure of 30 kN. At this point, two polyethylene terephthalate films having a rough surface shape of line roughness Ra=0.2 μm, Sm=1.9 μm (measured with a shape analysis laser microscope VK-X110 manufactured by Keyence Corporation (JIS-B-0601-1994)) were transported such that the rough surfaces face the front and back surfaces of the film C, and the rough shapes were transferred and formed on the front and back surfaces of the film C.

After the calender treatment, the film C was passed through an overheated steam tank at a temperature of 150° C. for 120 seconds to perform heat treatment. The film after the heat treatment is referred to as a film D. This film D was a conductive member.

Next, Examples 1 to 3 and Comparative Examples 1 and 2 are described.

Example 1

Example 1 is a touch panel having a conductive member of the same shape as that of the conductive member 1 of Embodiment 1 illustrated in FIGS. 1 to 9. In the first mesh pattern MP1 and the second mesh pattern MP2, the acute angle of the rhombuses of the first mesh cell C1 and the second mesh cell C2 was set to 72 degrees, and the length of one side of the first mesh cell C1 and the second mesh cell C2 was set to 696 μm (from an acute angle of 72°, mesh pitches PA1 and PA2 corresponded to 818 μm). The line width of all the metal fine wires was 4 μm. The second gap G1B between the metal fine wires M1A and the metal fine wires M1B and the second gap G2B between the metal fine wires M2A and the metal fine wires M2B had a length of ¼ or more of the length of the side of each of the mesh cells C1 and C2, that is, 174 μm or more. The length of the relatively small first gap G1A between the metal fine wires M1A and the metal fine wires M1B and the length of the relatively small first gap G2A between the metal fine wires M2A and the metal fine wires M2B were set to 10 μm. The arrangement pitch of the plurality of first electrodes 11 was set to 4.5 mm, and the width of each of the first electrodes 11 was set to 4.1 mm. The arrangement pitch of the plurality of second electrodes 21 was set to 4.5 mm, and the width of each of the second electrodes 21 was set to 2.25 mm. Dummy electrodes were arranged between the adjacent first electrodes 11 and between the adjacent second electrodes 21.

Example 2

Example 2 was the same as Example 1 except that the conductive member had the same shape as the conductive member of Embodiment 2 illustrated in FIGS. 10 to 14. In the same manner as in Example 1, the second gap G1B between the metal fine wires M1A and the metal fine wires M1B and the second gap G2B between the metal fine wires M2A and the metal fine wires M2B had a length of ¼ or more of the length of the side of the mesh cells C1 and C2, that is, 174 μm or more. The length of the relatively small first gap G1A between the metal fine wires M1A and the metal fine wires M1B and the length of the relatively small first gap G2A between the metal fine wires M2A and the metal fine wires M2B were set to 10 μm.

Example 3

Example 3 was the same as Example 1 except that the conductive member had the same shape as the conductive member of Embodiment 3 illustrated in FIGS. 15 to 19. That is, the conductive member of Example 3 did not have the second gaps G1B and G2B which were relative large gaps. Meanwhile, the length of the first gaps G1A and G2A was set to 10 μm.

Example 4

Example 4 was the same as Example 1 except that the conductive member had the same shape as the conductive member of Embodiment 4 illustrated in FIGS. 20 to 22. In the same manner as in Example 1, the second gap G1B between the metal fine wires M1A and the metal fine wires M1B and the second gap G2B between the metal fine wires M2A and the metal fine wires M2B had a length of ¼ or more of the length of the side of the mesh cells C1 and C2, that is, 174 μm or more. The length of the relatively small first gap G1A between the metal fine wires M1A and the metal fine wires M1B and the length of the relatively small first gap G2A between the metal fine wires M2A and the metal fine wires M2B were set to 10 μm. The length of the projection portions J1 and J2 was set to 20 μm.

Comparative Example 1

Comparative Example 1 was the same as Example 1 except for not having the dummy pattern portions 11B in the first electrode of the first electrodes 11 in the conductive member 1 of Embodiment 1 illustrated in FIGS. 1 to 9 and the dummy pattern portions 21B in the second electrode of the second electrodes 21.

Figure 23:
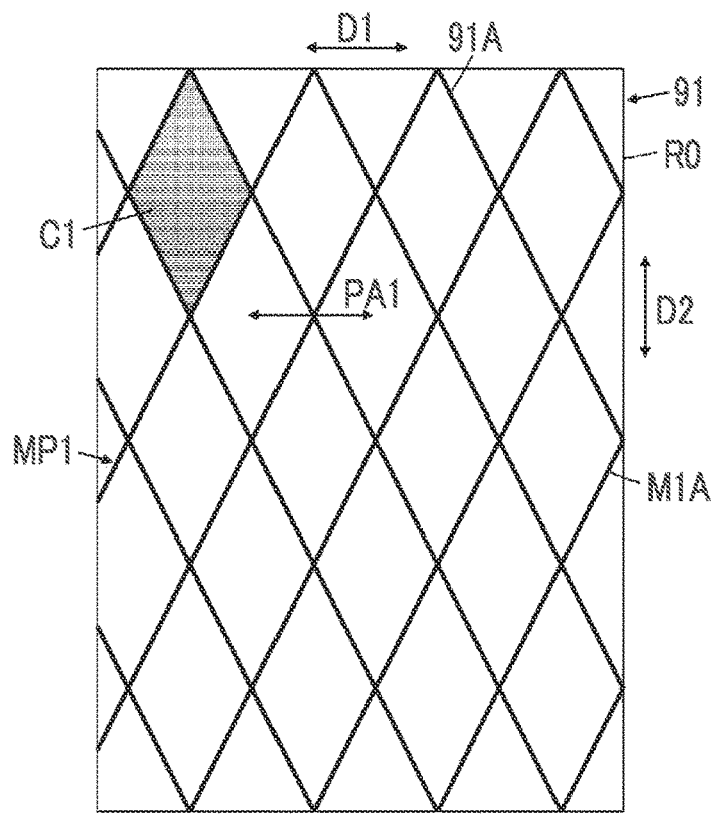
FIG. 23 is a partial plan view of only a first electrode in an electrode intersection portion of the conductive member according to Comparative Example 1 seen from viewing side.

FIG. 23 illustrates a partial plan view of only a first electrode 91 in an electrode intersection portion of a conductive member according to Comparative Example 1 seen from a viewing side. The first electrode 91 is formed on the first surface 5A of the transparent insulating substrate 5 illustrated in FIG. 1.

The first electrode 91 does not have a dummy pattern portion in the electrode but only has first detection electrode portions 91A illustrated in FIG. 23. The first detection electrode portion 91A is formed from the metal fine wires M1A.

In the same manner as the first detection electrode portions 11A in Embodiment 1, the first detection electrode portions 91A form the first mesh pattern MP1 having the first mesh pitch PA1 to which the plurality of first mesh cells C1 are electrically connected, by using the rhombic first mesh cells C1 as constitutional units.

Figure 24:
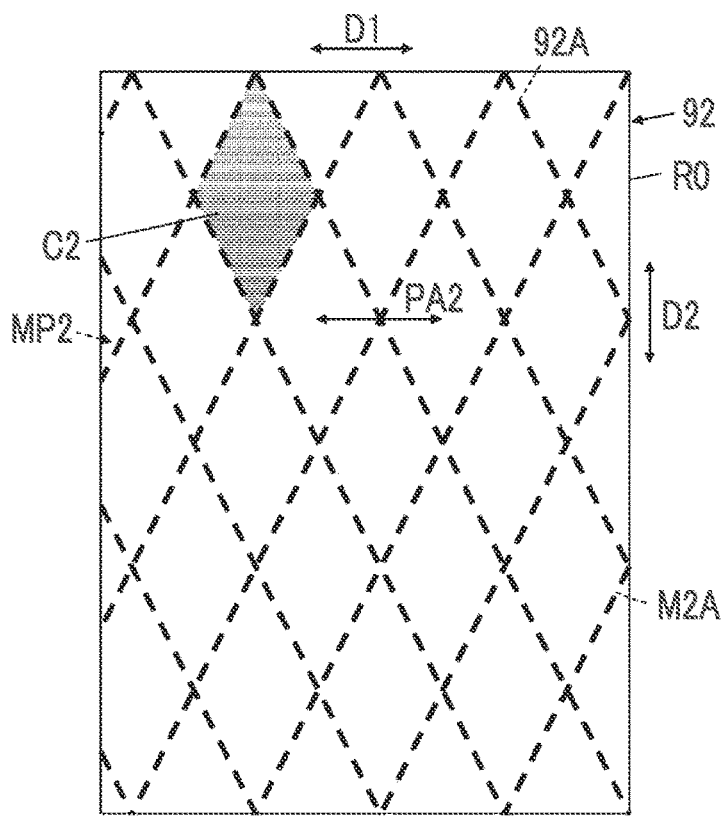
FIG. 24 is a partial plan view illustrating only a second electrode in the electrode intersection portion of the conductive member according to Comparative Example 1 seen from viewing side.

FIG. 24 illustrates a partial plan view of only a second electrode 92 in an electrode intersection portion of a conductive member according to Comparative Example 1 seen from a viewing side. The second electrode 92 is formed on the second surface 5B of the transparent insulating substrate 5 illustrated in FIG. 1.

In the same manner as the first electrode 91, the second electrode 92 does not have a dummy pattern portion in the electrode but only has second detection electrode portions 92A illustrated in FIG. 24. The second detection electrode portion 92A is formed from the metal fine wires M2A.

In the same manner as the first mesh pattern MP1, the second detection electrode portions 92A form the second mesh pattern MP2 having the second mesh pitch PA2 to which the plurality of second mesh cells C2 are electrically connected, by using the rhombic second mesh cells C2 as constitutional units.

Figure 25:
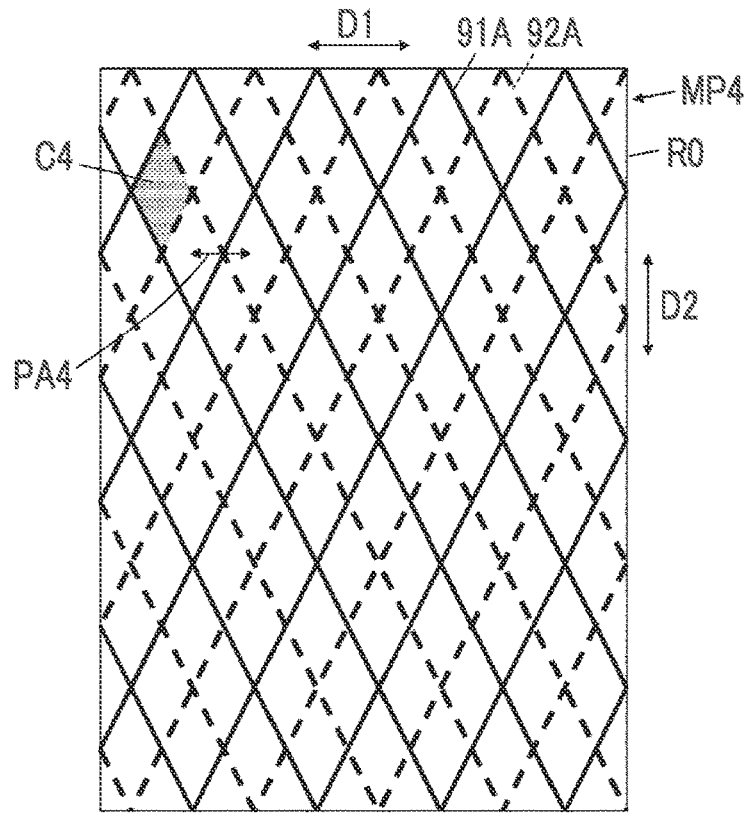
FIG. 25 is a partial plan view illustrating a third mesh pattern formed of the first electrode and the second electrode in the electrode intersection portion of the conductive member according to Comparative Example 1 seen from viewing side.

In Comparative Example 1, the second mesh pattern MP2 is arranged so as to be deviated by ½ of the first mesh pitch PA1 with respect to the first mesh pattern MP1. Accordingly, in the region R0 in the electrode intersection portion, in a case where the first electrodes 91 and the second electrodes 92 are observed on the viewing side, as illustrated in FIG. 25, the first detection electrode portions 91A of the first electrodes 91 and the second detection electrode portions 92A of the second electrode 92 are combined with each other, so as to form the fourth mesh pattern MP4 using the rhombic fourth mesh cell C4 as constitutional units and having the fourth mesh pitch PA4. The fourth mesh pitch PA4 has a value of ½ of the first mesh pitch PA1 and the second mesh pitch PA2 of the first mesh pattern MP1 and the second mesh pattern MP2.

Comparative Example 2

Figure 26:
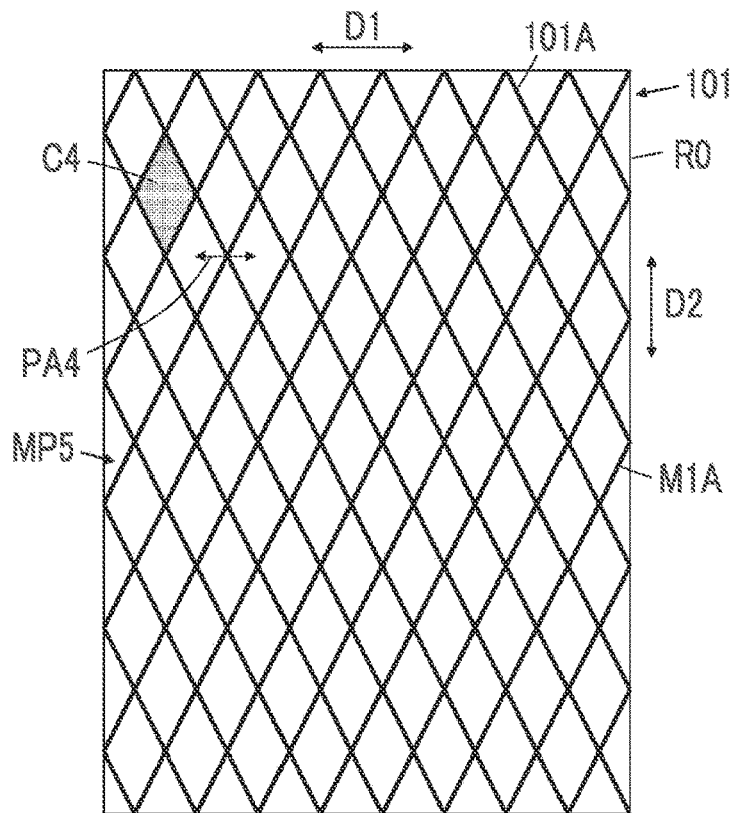
FIG. 26 is a partial plan view of only a first electrode in an electrode intersection portion of the conductive member according to Comparative Example 2 seen from viewing side.

FIG. 26 illustrates a partial plan view of only a first electrode 101 in an electrode intersection portion of a conductive member according to Comparative Example 2 seen from a viewing side. The first electrode 101 is formed on the first surface 5A of the transparent insulating substrate 5 illustrated in FIG. 1.

In the same manner as Comparative Examples 1, the first electrode 101 does not have a dummy pattern portion in the electrode but only has first detection electrode portions 101A illustrated in FIG. 26. The first detection electrode portion 101A is formed from the metal fine wires M1A.

The first detection electrode portions 101A form the fifth mesh pattern MP5 having the fourth mesh pitch PA4 to which the plurality of fourth mesh cells C4 are electrically connected, by using the rhombic fourth mesh cells C4 as constitutional units. The fourth mesh pitch PA4 has a value of ½ of the first mesh pitch PA1 and the second mesh pitch PA2 of the first mesh pattern MP1 and the second mesh pattern MP2 in Comparative Example 1.

Figure 27:
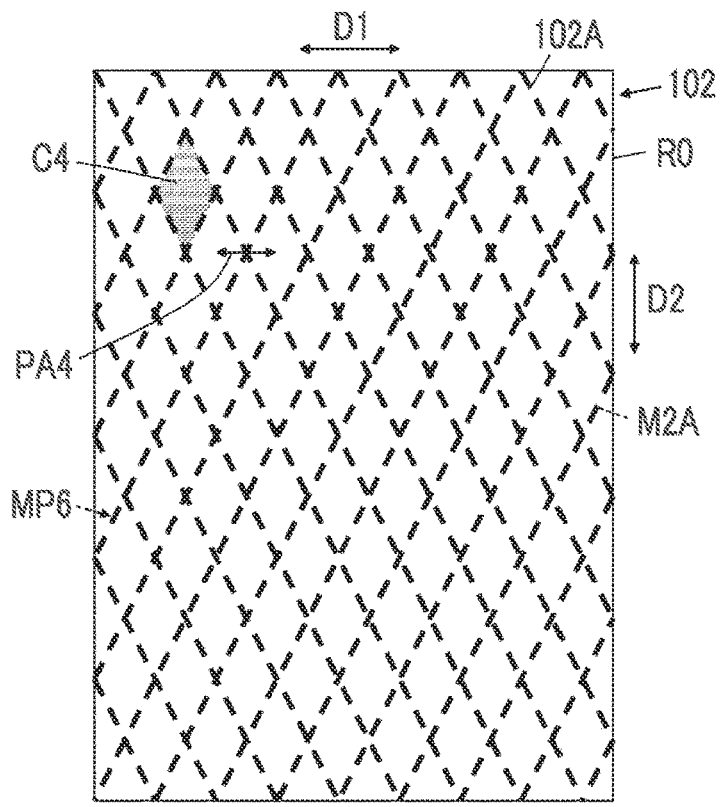
FIG. 27 is a partial plan view illustrating only a second electrode in the electrode intersection portion of the conductive member according to Comparative Example 2 seen from viewing side.

FIG. 27 illustrates a partial plan view of only a second electrode 102 in an electrode intersection portion of a conductive member according to Comparative Example 2 seen from a viewing side. The second electrode 102 is formed on the second surface 5B of the transparent insulating substrate 5 illustrated in FIG. 1.

In the same manner as the first electrode 101, the second electrode 102 does not have a dummy pattern portion in the electrode but only has second detection electrode portions 102A illustrated in FIG. 27. The second detection electrode portion 102A is formed from the metal fine wires M2A.

In the same manner as the fifth mesh pattern MP5, the second detection electrode portions 102A form the sixth mesh pattern MP6 having the fourth mesh pitch PA4 to which the plurality of fourth mesh cells C4 are electrically connected, by using the rhombic fourth mesh cells C4 as constitutional units.

Figure 28:
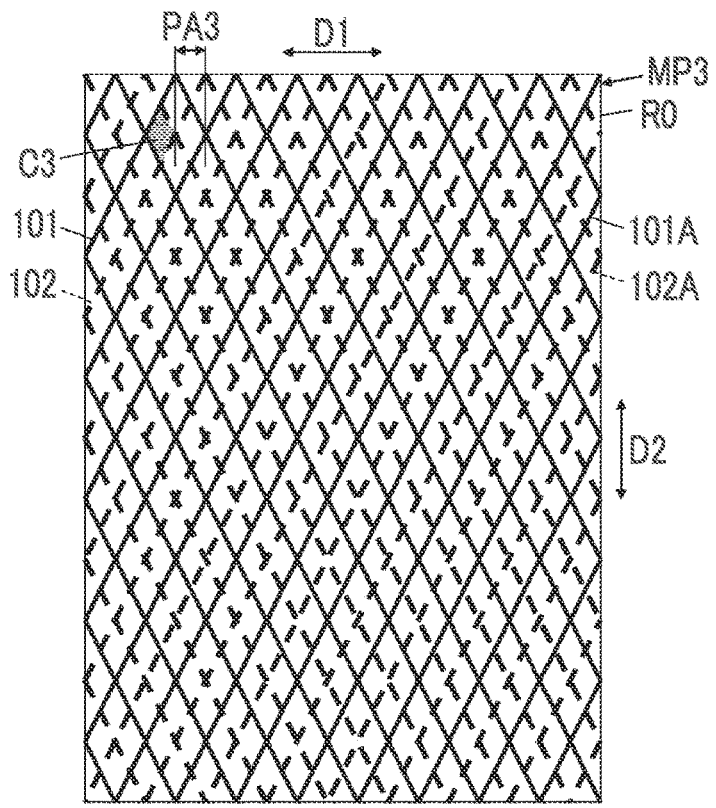
FIG. 28 is a partial plan view illustrating a third mesh pattern formed of the first electrode and the second electrode in the electrode intersection portion of the conductive member according to Comparative Example 2 seen from viewing side.

In Comparative Example 2, the sixth mesh pattern MP6 is arranged so as to be deviated by ½ of the fourth mesh pitch PA4 with respect to the fifth mesh pattern MP5. Accordingly, in the region R0 in the electrode intersection portion, in a case where the first electrodes 101 and the second electrodes 102 are observed on the viewing side, as illustrated in FIG. 28, the first detection electrode portions 101A of the first electrodes 101 and the second detection electrode portions 102A of the second electrode 102 are combined with each other, so as to form the third mesh pattern MP3 using the rhombic third mesh cell C3 as constitutional units and having the third mesh pitch PA3. The third mesh pitch PA3 has a value of ½ of the fourth mesh pitch PA4 of the fifth mesh pattern MP5 and the sixth mesh pattern MP6.

In this manner, Comparative Example 2 is the same as Comparative Example 1 except that the length of one side of the rhombic fourth mesh cell C4 using the fifth mesh pattern MP5 formed of the first detection electrode portions 101A and the sixth mesh pattern MP6 formed of the second detection electrode portions 102A, as constitutional units is caused to be ½ of 348 μm (from an acute angle of 72 degrees, the mesh pitch PA4 corresponds to 409 μm) compared with the length (696 μm) of one side of the first mesh cell C1 and the second mesh cell C2 of the first mesh pattern MP1 and the second mesh pattern MP2 in Comparative Example 1.

The evaluation results of Examples 1 to 4 and Comparative Examples 1 and 2 are presented in the following table.

TABLE 1

| | Mesh pitch in first detection electrode portion and second detection electrode portion [μm] | Dummy pattern portion in electrode | Metal fine wires in dummy pattern portion in electrode intersect with each other in cross shape | Sensitivity | Visibility | Moire |
|---|---|---|---|---|---|---|
| Example 1 | 818 | Presence | Absence | A | A | A |
| Example 2 | 818 | Presence | Presence | A | B | B |
| Example 3 | 818 | Presence | Presence | B | B | B |
| Example 4 | 818 | Presence | Absence | A | A | A |
| Comparative Example 1 | 818 | Absence | Absence | A | C | C |
| Comparative Example 2 | 409 | Absence | Absence | C | A | A |

As presented in Table 1, in Examples 1 to 4, all of the sensitivity evaluation, the visibility evaluation, and the moire evaluation were "A" or "B", and the detection sensitivity was improved, the visibility was excellent, and the generation of the moire can be decreased. Particularly, in Examples 1 and 4, all of the sensitivity evaluation, the visibility evaluation, and the moire evaluation were "A", the detection sensitivity was excellent, the visibility was improved, and the generation of the moire was decreased.

Meanwhile, in Comparative Example 1, the sensitivity evaluation was "A", but the visibility evaluation and the moire evaluation were "C". In Comparative Example 2, the visibility evaluation and the moire evaluation were "A", but the sensitivity evaluation was "C". In this manner, in Comparative Examples 1 and 2, all of the sensitivity, the visibility, and the moire were not highly evaluated.

In Example 3, since, according to the presence of the dummy pattern portions 51B in the first electrode, four cells having a half pitch of the first mesh pitch PA1 were formed in the first mesh cells C1 of the first mesh pattern MP1 of the first detection electrode portions 51A, and in the same manner, according to the presence of the dummy pattern portions 61B in the second electrode, four cells having a half pitch of the second mesh pitch PA2 were formed in the second mesh cell C2 of the second mesh pattern MP2 of the second detection electrode portions 61A, the parasitic capacitances of the first detection electrode portions 51A and the second detection electrode portions 61A were increased compared with those in Examples 1 and 2, and thus the sensitivity evaluation was "B".

In Examples 2 and 3 having points at which the dummy pattern portions in the second electrode intersected with each other in a cross shape, the visibility evaluation and the moire evaluation were "B", but this is because points at which the dummy pattern portions in the second electrode intersected with each other in a cross shape were formed larger than the design value due to diffracted light from the photo mask edge portion in the exposure and development step in a case of manufacturing the conductive member.

In Comparative Example 1, it is considered that, since all of the first electrode 91 and the second electrode 92 have the first mesh pitch PA1, the sensitivity evaluation was "A", but the mesh pitch (fourth mesh pitch PA4) of the fourth mesh pattern MP4 formed by overlapping the first electrodes 91 and the second electrodes 92 with each other was twice the mesh pitch (the third mesh pitch PA3) of the third mesh pattern MP3 in Examples 1 to 3, that is, the mesh pitch was wide, the visibility evaluation and the moire evaluation were "C".

It is considered that Comparative Example 2 did not have a dummy pattern portion in the electrode, but since the first electrodes 101 and the second electrodes 102 were overlapped with each other, the third mesh pattern MP3 having the third mesh pitch PA3 was formed as in Example 1, and thus the visibility evaluation and the moire evaluation were "A". Meanwhile, it is considered that, since the fifth mesh pattern MP5 formed of the first detection electrode portion 101A of the first electrode 101 used for detecting a touch operation and the sixth mesh pattern MP6 formed by the second detection electrode portion 102A of the second electrode 102 had a half pitch (fourth mesh pitch PA4) of the first mesh pitch PA1 in Example 1, the parasitic capacitance of the first detection electrode portion 101A and the second detection electrode portion 102A were increased, and thus the sensitivity evaluation was "C".

Another aspect is noted as follows.

A conductive member comprising:

a plurality of first electrodes each of which extend in a first direction and which are arranged in juxtaposition in a second direction orthogonal to the first direction; and a plurality of second electrodes each of which extend in the second direction and which are arranged in juxtaposition in the first direction, wherein the plurality of first electrodes and the second electrodes are arranged to face each other in an insulation state, the first electrode has a first detection electrode portion having a first mesh pattern constituted by electrically connecting a plurality of first mesh cells formed of metal fine wires and a dummy pattern portion in a first electrode which is formed of metal fine wires arranged inside the first mesh cell of the first mesh pattern so as to be insulated from the first detection electrode portion, the second electrode has a second detection electrode portion having a second mesh pattern constituted by electrically connecting a plurality of second mesh cells formed of metal fine wires and a dummy pattern portion in the second electrode which is formed of metal fine wires arranged inside the second mesh cell of the second mesh pattern so as to be insulated from the second detection electrode portion, and in a region in which the first electrode and the second electrode are overlapped with each other, a third mesh pattern is constituted by a plurality of third mesh cells formed by combining the first detection electrode portion, the dummy pattern portion in the first electrode, the second detection electrode portion, and the dummy pattern portion in the second electrode.

EXPLANATION OF REFERENCES

1: conductive member
2: touch panel
2A: front surface
2B: back surface
3: cover panel
4: adhesive
5: transparent insulating substrate
5A: first surface
5B: second surface
7A, 7B: protective layer
11, 31, 51, 71, 81, 91, 101: first electrode
11A, 31A, 51A, 71A, 91A, 101A: first detection electrode portion
11B, 31B, 51B, 71B: dummy pattern portion in a first electrode
12: first edge part wire
13: first external connection terminal
14: first connector portion
21, 41, 61, 81, 92, 102: second electrode
21A, 41A, 61A, 72A, 81A, 92A, 102A: second detection electrode portion
21B, 41B, 61B, 81B: dummy pattern portion in a second electrode
22: second edge part wire
23: second external connection terminal
24: second connector portion
72: first dummy electrode
82: second dummy electrode
S1: transmissive region
S2: edge part region
D1: first direction
D2: second direction
6A, 6B, M1A, M1B, M2A, M2B: metal fine wire
G1A, G2A: first gap
G1B, G2B: second gap
W1A, W1B, W2A, W2B: line width
R0, R1A, R1B, R2A, R2B: region
T1A: first detection unit pattern
T1B: first dummy unit pattern
T2B: second dummy unit pattern
T3B: third dummy unit pattern
T4B: fourth dummy unit pattern
T5B: fifth dummy unit pattern
T6B: sixth dummy unit pattern
T7B: seventh dummy unit pattern T8B: eighth dummy unit pattern
MP1: first mesh pattern
MP2: second mesh pattern
MP3: third mesh pattern
MP4: fourth mesh pattern
MP5: fifth mesh pattern
MP6: sixth mesh pattern
C1: first mesh cell
C2: second mesh cell
C3: third mesh cell
C4: fourth mesh cell
PA1: first mesh pitch
PA2: second mesh pitch
PA3: third mesh pitch
PA4: fourth mesh pitch
J1, J2: projection portion
B1, B2: disconnected portion
ΔL: distance

What is claimed is:

1. A conductive member having a transmissive region, comprising:
a transparent insulating member; and
a plurality of first electrodes each of which extend in a first direction and which are arranged in juxtaposition in a second direction orthogonal to the first direction,
wherein the first electrode has a first detection electrode portion having a first mesh pattern constituted by electrically connecting a plurality of first mesh cells formed of metal fine wires and a first dummy pattern portion in the first electrode which is formed of metal fine wires arranged inside the first mesh cell of the first mesh pattern so as to be insulated from the first detection electrode portion, and
in at least one of the first mesh cells, a first projection portion projecting from one side of the first mesh cell is formed so as to abut an end portion of the metal fine wire that forms the first dummy pattern portion.

2. The conductive member according to claim 1,
wherein an end portion of the first projection portion is spaced from the end portion of the metal fine wire that forms the first dummy pattern portion by a first gap of 5 μm or more and 25 μm or less.

3. The conductive member according to claim 2,
wherein a length of the first projection portion is 50 μm or less.

4. The conductive member according to claim 3,
wherein the length of the first projection portion is 10 μm or more and 30 μm or less.

5. A touch panel comprising the conductive member according to claim 1.

6. A conductive member having a transmissive region, comprising:
a transparent insulating member;
a plurality of first electrodes each of which extend in a first direction and which are arranged in juxtaposition in a second direction orthogonal to the first direction; and
a plurality of second electrodes each of which extend in the second direction and which are arranged in juxtaposition in the first direction,
wherein the plurality of first electrodes and the plurality of second electrodes are opposed to each other with the transparent insulating member interposed therebetween,
the first electrode has a first detection electrode portion having a first mesh pattern constituted by electrically connecting a plurality of first mesh cells formed of metal fine wires and a first dummy pattern portion in the first electrode which is formed of metal fine wires arranged inside the first mesh cell of the first mesh pattern so as to be insulated from the first detection electrode portion,
in at least one of the first mesh cells, a first projection portion projecting from one side of the first mesh cell is formed so as to abut an end portion of the metal fine wire that forms the first dummy pattern portion,
the second electrode has a second detection electrode portion having a second mesh pattern constituted by electrically connecting a plurality of second mesh cells formed of metal fine wires and a second dummy pattern portion in the second electrode which is formed of metal fine wires arranged inside the second mesh cell of the second mesh pattern so as to be insulated from the second detection electrode portion,
in at least one of the second mesh cells, a second projection portion projecting from one side of the second mesh cell is formed so as to abut an end portion of the metal fine wire that forms the second dummy pattern portion, and
in a region in which the first electrode and the second electrode are overlapped with each other, a third mesh pattern is constituted by a plurality of third mesh cells formed by combining the first detection electrode portion, the first dummy pattern portion in the first electrode, the second detection electrode portion, and the second dummy pattern portion in the second electrode.

7. The conductive member according to claim 6,
wherein an end portion of the first projection portion is spaced from the end portion of the metal fine wire that forms the first dummy pattern portion by a first gap of 5 μm or more and 25 μm or less, and
an end portion of the second projection portion is spaced from the end portion of the metal fine wire that forms the second dummy pattern portion by the first gap of 5 μm or more and 25 μm or less.

8. The conductive member according to claim 7,
wherein a length of the first projection portion is 50 μm or less, and
a length of the second projection portion is 50 μm or less.

9. The conductive member according to claim 8,
wherein the length of the first projection portion is 10 μm or more and 30 μm or less, and
the length of the second projection portion is 10 μm or more and 30 μm or less.

10. A touch panel comprising the conductive member according to claim 6.

* * * * *